United States Patent
Ono et al.

(10) Patent No.: US 7,940,347 B2
(45) Date of Patent: May 10, 2011

(54) BACKLIGHT UNITS WITH QUICK INSTALLATION AND REMOVAL OF LIGHT EMITTING STRUCTURES

(75) Inventors: Shin-ichirou Ono, Kanagawa (JP); Hirokazu Fukuyoshi, Kanagawa (JP)

(73) Assignee: NEC Corporation, Tokyo (JP)

( * ) Notice: Subject to any disclaimer, the term of this patent is extended or adjusted under 35 U.S.C. 154(b) by 1113 days.

(21) Appl. No.: 10/849,285

(22) Filed: May 19, 2004

(65) Prior Publication Data

US 2004/0233154 A1 Nov. 25, 2004

(30) Foreign Application Priority Data

May 19, 2003 (JP) .................................. 2003-140226

(51) Int. Cl.
*G02F 1/1333* (2006.01)
*G02F 1/1335* (2006.01)
*F21V 7/04* (2006.01)

(52) U.S. Cl. ............ 349/58; 349/61; 362/632; 362/633; 362/634

(58) Field of Classification Search .................... 349/58, 349/61; 362/632, 633, 634; 345/102
See application file for complete search history.

(56) References Cited

U.S. PATENT DOCUMENTS

| 5,987,794 | A * | 11/1999 | Lavi et al. .................. 40/611.04 |
| 6,266,123 | B1 * | 7/2001 | Maejima et al. .............. 349/160 |
| 6,411,353 | B1 * | 6/2002 | Yarita et al. ..................... 349/59 |
| 6,445,373 | B1 * | 9/2002 | Yamamoto ..................... 345/102 |
| 6,545,732 | B2 * | 4/2003 | Nakano ........................... 349/58 |
| 7,095,457 | B2 * | 8/2006 | Chou ............................ 348/794 |
| 7,150,557 | B2 * | 12/2006 | Chen et al. .................... 362/614 |

FOREIGN PATENT DOCUMENTS

| EP | 0 985 949 A2 | 3/2000 |
| JP | 7-16925 | 3/1995 |
| JP | HEI 08-043816 | 2/1996 |
| JP | 2000-092415 | 3/2000 |
| JP | 2000-338483 | 12/2000 |
| JP | 2001-076529 | 3/2001 |
| JP | 2001-117075 | 4/2001 |
| KR | 2001-56971 | 7/2001 |
| TW | 583444 | 4/2004 |

\* cited by examiner

*Primary Examiner* — Michael H Caley

(74) *Attorney, Agent, or Firm* — Scully, Scott, Murphy & Presser, P.C.

(57) ABSTRACT

A backlight unit comprises a chassis having a bay, wall means defining the bay, an aperture opening to the bay, and an optical panel that includes at least one light management feature. The optical panel has one side forming a wall portion of the wall means. A light emitting structure is placed within the bay to light a two-dimensional area on the one side of the optical panel. The backlight unit also comprises a bracket for quick installation and removal of the light emitting structure through the aperture to and from the bay.

1 Claim, 26 Drawing Sheets

BACKLIGHT UNITS WITH QUICK INSTALLATION AND REMOVAL OF LIGHT EMITTING STRUCTURES

BACKGROUND OF THE INVENTION

1. Field of the Invention

The present invention relates generally to backlight units. More particularly, the present invention relates to a backlight unit placed on a rear face of a display or between rear faces of two parallel displays to provide back lighting for the display(s).

2. Description of Related Art

Display devices such as liquid crystal displays (LCDs) are commonly used for displays for many electronic devices such as personal digital assistants (PDAs), cellular phones, laptop computers, and televisions, all applications where light weight, low power and a flat panel display are desired. An LCD is essentially a light switching device that does not emit any light on its own. LCDs may be divided into three types: reflective, transflective and transmissive. Reflective LCD use ambient light, and requires no back lighting. However, transmissive and transflective LCDs require back lighting.

In conventional backlit LCDs for televisions, the backlights are cold cathode fluorescent lamps (linear light sources). The linear light sources are placed on a rear face of a display. The area of the display to be lit is a two-dimensional area. The linear light sources are managed by at least one light management feature, which converts linear light sources to light over a two dimensional area, to thereby illuminate The two-dimensional display area.

Referring to FIGS. 30-32, one example of the conventional backlit display devices is described. FIG. 30 is an exploded view of a conventional display device, generally denoted by the reference numeral 10. The display device 10 includes a light control device 12 and a backlight unit 14. FIG. 31 is an exploded view of the backlight unit 14 and FIG. 32 is a cross section taken through the line 32-32 in FIG. 30. The light control device 12 is a liquid crystal display (LCD) having an LCD panel 16 connected to substrates 18 and 20 by means of transmission control protocols (TCPs) 22.

As shown in FIGS. 31 and 32, the backlight unit 14 includes an optical panel 24 that includes at least one light management feature. The at least one light management feature includes a first light management feature within the panel 24 (see FIG. 31) and a second light management feature 26. The first light management feature may include a light diffusing feature. In the illustrated example, the panel 24 is manufactured with the light diffusing feature and thus ma be called a light diffusing panel. The second light management feature 26 may include one or more features such as a brightness enhancement film and/or a light diffusing film. The backlight unit 14 has a light emitting structure 28. The light emitting structure 28 includes a parallel arrangement of a plurality of linear lamps 30 and a power control circuit that includes an inverter substrate 32, a return substrate 34 and a return cable 36.

The backlight unit 14 also includes a chassis 38, a light inflecting cover 40 and a support structure 42 carrying the light emitting structure 28. The support structure 42 includes two spaced cross boards 44 and 46 for holding one and the opposite ends of each of the liner lamps 30. As best seen in FIG. 32, the light inflecting cover 40 has a protrusion 48 (a spacer) that is in contact with the light diffusing panel 24 to keep structural rigidity of the backlight unit 14. The light inflecting cover 40 is pressed into engagement with the chassis 38, to thereby hold the light diffusing panel 24 with the second light management feature 26 in cooperation with the two spaced cross boards 44 and 46 to cover a rectangular opening 50 of the chassis 38. This rigid structure provides a space containing the light emitting structure 28.

Referring back to FIG. 30, the chassis 38 is formed with four mount posts 52. Using these mount posts 52, the chassis 38 supports the LCD panel 16 of the light control device 12 in an appropriate position to cover the rectangular opening 50. In cooperation with a front case 54, the chassis 38 holds the LCD panel 16. The chassis 38 is required to be structurally strong enough to keep the two-dimensional display area on the LCD panel 16 in a desired flat state over its operating life.

Each linear lamp 30 has its life period shorter than the LCD panel 16. Replacing lamps is preferred in order to provide good illumination of the display area over the operating life of the LCD panel 16. The conventional approach for lamp replacement requires disassembling to remove the backlight unit 14 from the front case 54 and the light control device 12. A new backlight unit is reassembled with the front case 54 and the light control device 12. The conventional approach for lamp replacement is disadvantageous because the steps of disassembling and reassembling are time-consuming. The conventional approach for lamp replacement is also disadvantageous because the other components of the removed backlight unit in addition to lamp or lamps to be replaced are abandoned, causing a pick up of maintenance fee. The conventional approach for lamp replacement is further disadvantageous because the LCD panel 16 is left exposed to dust and/or foreign particles within the ambient atmosphere and vulnerable to stains when the backlight unit is removed. The stains on the LCD panel 16 cause local loss in illuminating the display area, to thereby degrade display quality.

Laid-open publication of Japanese UM application H7-16925 discloses a display device wherein a backlight unit is inserted into or removed from a housing of a light control device through an aperture. The backlight unit includes a light shield to cover the aperture. This approach for lamp replacement is disadvantageous because all of the other components of the removed backlight unit in addition to lamp or lamps to be replaced may be abandoned. The conventional approach is also disadvantageous because the light control device is left exposed to the ambient atmosphere through the aperture when the backlight unit is removed.

Referring to FIGS. 33-35, another example of the conventional backlit display devices is described. FIG. 33 is an exploded view of a conventional display device, generally denoted by the reference numeral 60. The display device 60 includes a first light control device 62, a second light control device 64, and a backlight unit 66. FIG. 34 is an exploded view of the backlight unit 66 and FIG. 35 is a cross section taken through the line 35-35 in FIG. 33. The first light control device 62 is a liquid crystal display (LCD) having an LCD panel 68 connected to substrates 70 and 72 by means of transmission control protocols (TCPs) 74. The second light control device 64 is a liquid crystal display (LCD) having an LCD panel 76 connected to substrates 78 and 80 by means of transmission control protocols (TCPs), not shown.

As shown in FIGS. 34 and 35, the backlight unit 66 has a light emitting structure 84. The light emitting structure 84 includes a parallel arrangement of a plurality of linear lamps 86, light inflecting plates 87 (see FIG. 34), a power control circuit that includes an inverter substrate 88, a return substrate 90 and a return cable 92. On one side of the light emitting structure 84, the backlight unit 66 includes a panel 94 that includes at least one light management feature. The at least one light management feature, on the one side of the light emitting structure 84, includes a first light management feature within the panel 94 (see FIG. 34) and a second light management feature 96. On the opposite side of the light emitting structure 84, the backlight unit 66 includes a panel 98 that includes at least one light management feature, too. The at least one light management feature, on the opposite side of the light emitting structure 84, includes a third light management feature within the panel 98 (see FIG. 34) and a fourth light management feature 100. The first and third light management feature may include a light diffusing feature. In the illustrated example, the panel 94 and 98 are manufactured with the light diffusing feature and thus may be called a light diffusing panel. The second and fourth light management feature 96 and 100 may include one or more features such as a brightness enhancement film and/or a light diffusing film.

The backlight unit 66 also includes a first chassis half 102, a second chassis half 104, and a support structure 106 carrying the light emitting structure 84. The support structure 106 includes a first set of spaced cross boards 108 and 110 and a second set of spaced cross boards 112 and 114 for holding one and the opposite ends of each of the linear lamps 86 via rubbers 116 as best seen in FIG. 34.

Referring back to FIG. 33, the first chassis half 102 is formed with four mount posts 118, and the second chassis half 104 four mount posts, not shown. Using the mount posts 118, the first chassis half 102 supports the LCD panel 68 of the first light control device 62 in an appropriate position to cover a rectangular opening 120. Similarly, using the mount posts, not shown, the second chassis half 104 supports the LCD panel 76 of the second light control device 64 in an appropriate position to cover a rectangular opening 122 (see FIG. 35). The first and second chassis halves are pressed into locking engagement with each other to form a whole chassis. In cooperation with the first and second front case 124 and 126, the first and second chassis halves 102 and 104 hold the LCD panels 68 and 76, respectively. The first and second chassis halves 102 and 103 are required to be structurally strong enough to keep the two-dimensional display areas on the LCD panels 68 and 76 in a desired flat state over their operating life.

In the display device 60, as the backlight unit 66 is more complicated and bulky than the backlight unit 14, the disadvantages of the conventional approach for lamp replacement will become more apparent.

It would be desirable to produce improved backlight units and display devices with such improved backlight units, which allow replacement of light source or sources with less time, cost, and difficulty, and with little probability of staining a display panel to be lit during replacement of light source or sources.

SUMMARY OF THE INVENTION

According to an aspect of the present invention, a backlight unit comprises a chassis having a bay, wall means defining the bay, an aperture opening to the bay, and an optical panel that includes at least one light management feature. The optical panel has one side forming a wall portion of the wall means. The backlight unit also comprises a light emitting structure placed within the bay to light a two-dimensional area on the one side of the optical panel. The backlight unit further comprises a bracket for quick installation and removal of the light emitting structure through the aperture to and from the bay.

According to another aspect of the present invention, a display device comprises a display device comprises at least one light control device, and a backlight unit coupled to the at least on light control device. The backlight unit includes a chassis having a bay, wall means defining the bay, an aperture opening to the bay, and at least one optical panel. The at least one optical panel includes at least one light management feature. The at least one optical panel has one side forming a wall portion of the wall means, to thereby prevent exposure of the at least one light control device to the bay. The backlight unit also includes a light emitting structure placed within the bay to light a two-dimensional area on the one side of the at least one optical panel. The backlight unit further includes a bracket for quick installation and removal of the light emitting structure through the aperture to and from the bay.

DETAILED DESCRIPTION OF THE INVENTION

Figure 1:
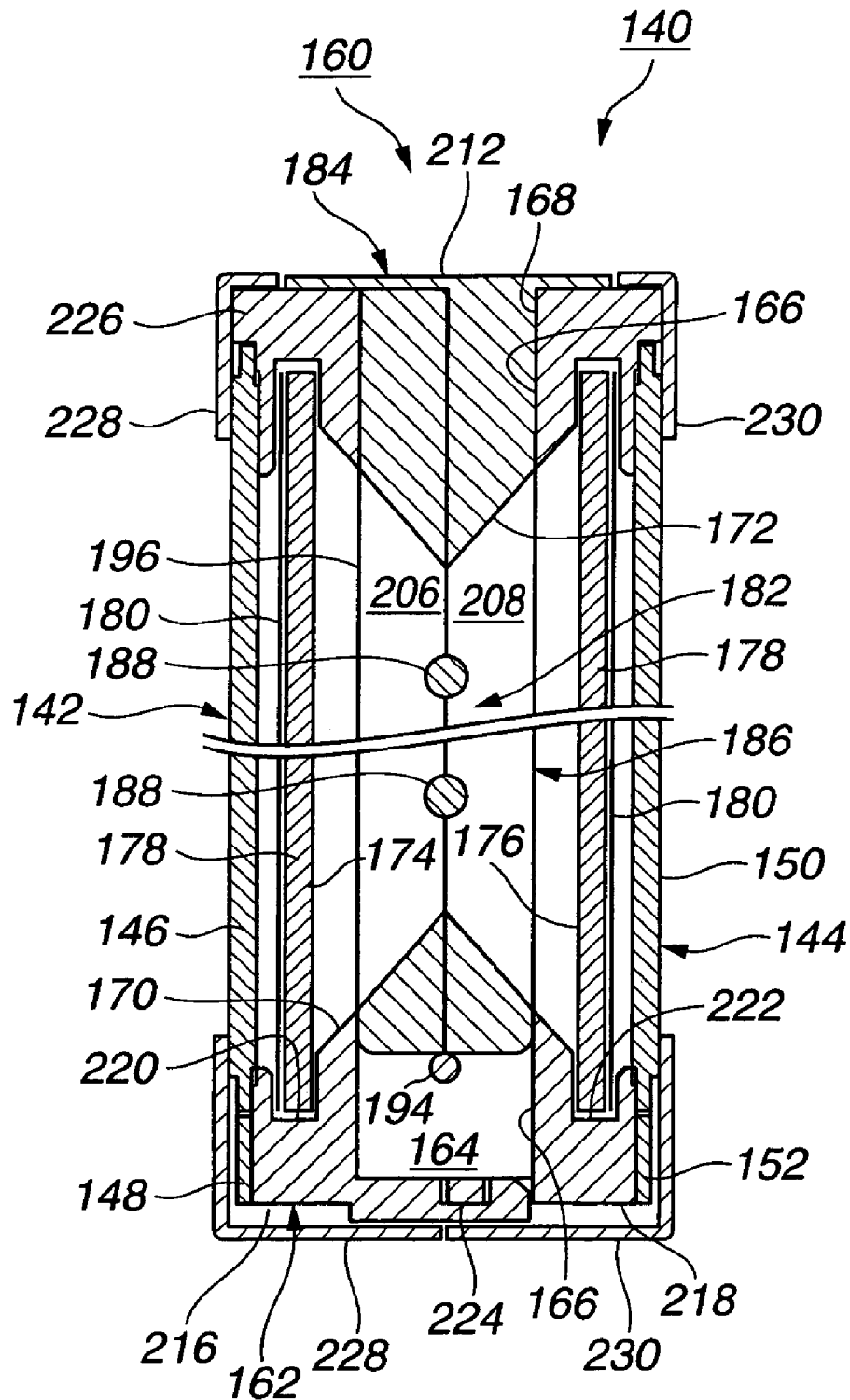
FIG. 1 is a schematic view combining fragments of different vertical cross sections of a display device, illustrating one embodiment of a backlight unit according to the present invention.

Referring now in detail to the drawings, and initially to FIG. 1, there is schematically shown a display device 140. The display device 140 includes at least one light control device. The light control device may be a liquid crystal display (LCD), for example having a plurality of picture elements, such as pixels, selectively activated to allow or block transmission of light through an LCD panel. The at least one light control device includes a first light control device 142 and a second light control device 144. Both the first and second light control devices 142 and 144 are schematically shown. The first light control device 142 includes an LCD panel 146 connected to substrates, only one being shown at 148, by means of transmission control protocols (TCPs), not shown. The second light control device 144 includes an LCD panel 150 connected to substrates, only one being shown at 152, by means of TCPs, not shown. The display device 140 includes one embodiment of a backlight unit 160 coupled to the at least one light control device. In the illustrated example, the backlight unit 160 is disposed between and optically coupled to the first and second light control devices 142 and 144 to provide a direct backlighting for them.

Figure 2:
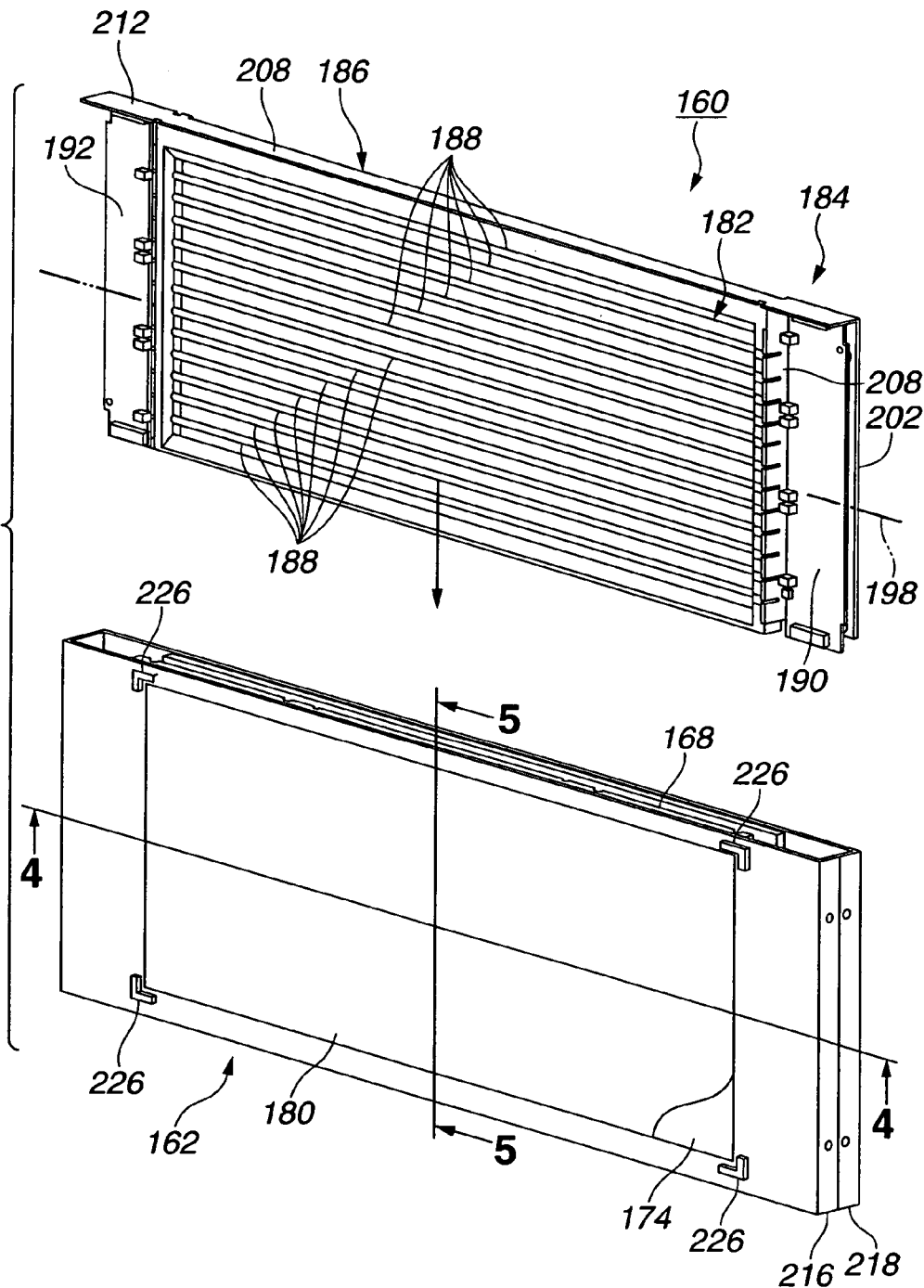
FIG. 2 is a perspective view of the backlight unit including a chassis and a bracket pulled out of the chassis.

Referring also to FIG. 2 with continuing reference to FIG. 1, the backlight unit includes a chassis 162. The chassis 162 has a bay 164 and walls (or wall means) 166 defining the bay 164. To allow an access to the bay 164, the chassis 162 has an aperture 168 opening to the bay 164. The wall means 166 has at least one window opening to allow passage of light therethrough for backlighting the associated one LCD panel. The chassis 162 has at least one optical panel covering the window opening such that its one side forms a wall portion of the wall means 166. In the illustrated example, the at least one window opening of the wall means 166 includes a first window opening 170 for backlighting the LCD panel 146 and a second window opening 172 for backlighting the LCD panel 150. The at least one optical panel includes a first optical panel 174 and a second optical panel 176. The first and second optical panels 174 and 176 cover the window openings 170 and 172, respectively. The first optical panel 174 is disposed between the first light control device 142 and the bay 164, to thereby prevent exposure of the first light control device 142 to the bay 164. The second optical panel 176 is disposed between the second light control device 144 and the bay 164, to thereby prevent exposure of the second light control device 144 to the bay 164.

The optical panel 174 or 176 includes at least one light management feature. The at least one light management feature may include a light diffusing feature in the optical panel. The at least one light management feature may include a light diffusing feature within the optical panel 174 or 176, as a first light management feature 178, and a second light management feature 180 on the optical panel 174 or 176. The second light management 180 is one selected from a group consisting of a brightness enhancing film and a light diffusing film. In the illustrated example, the second light management feature 180 is a light diffusing film.

Figure 3:
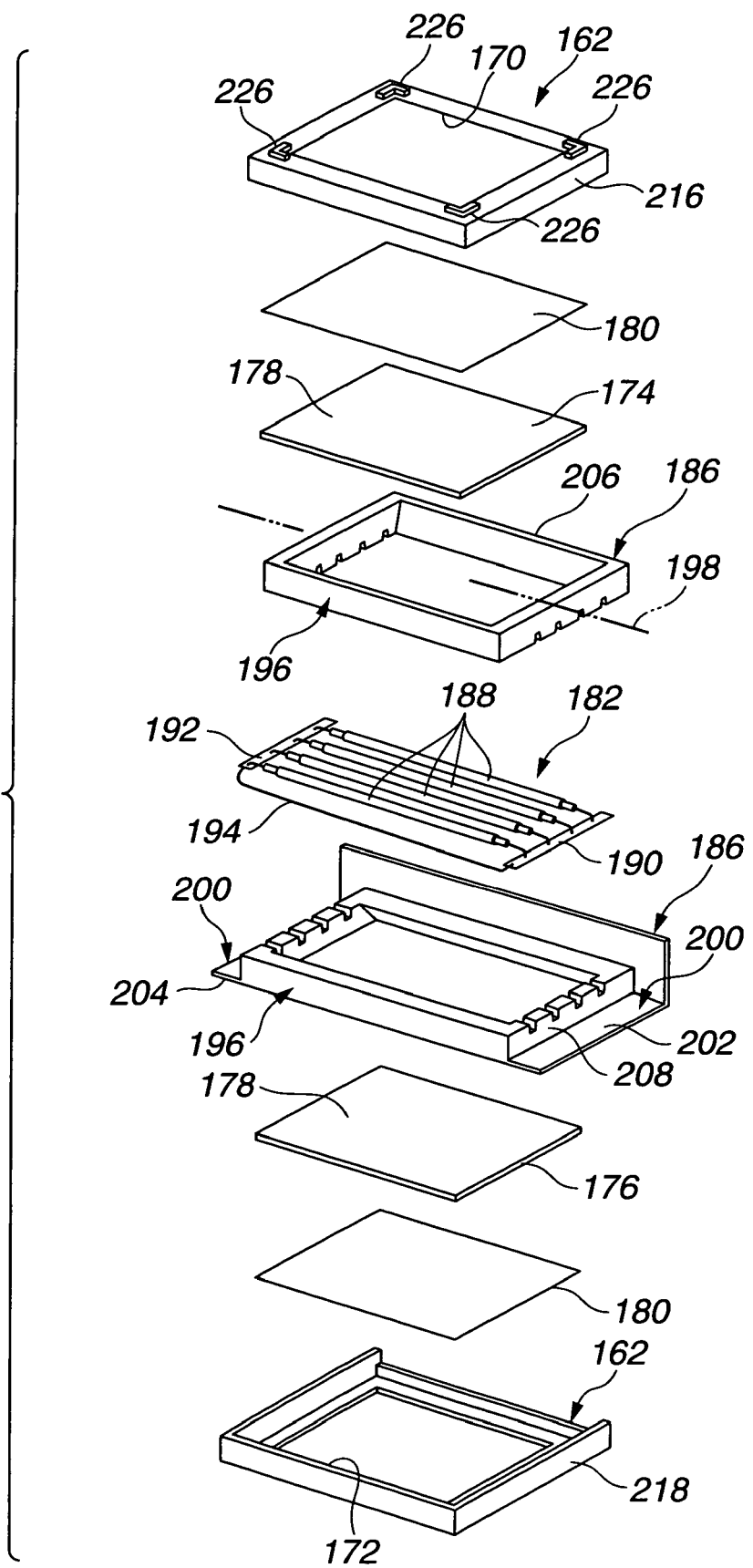
FIG. 3 is a schematic exploded view of the backlight unit.
Figure 4:
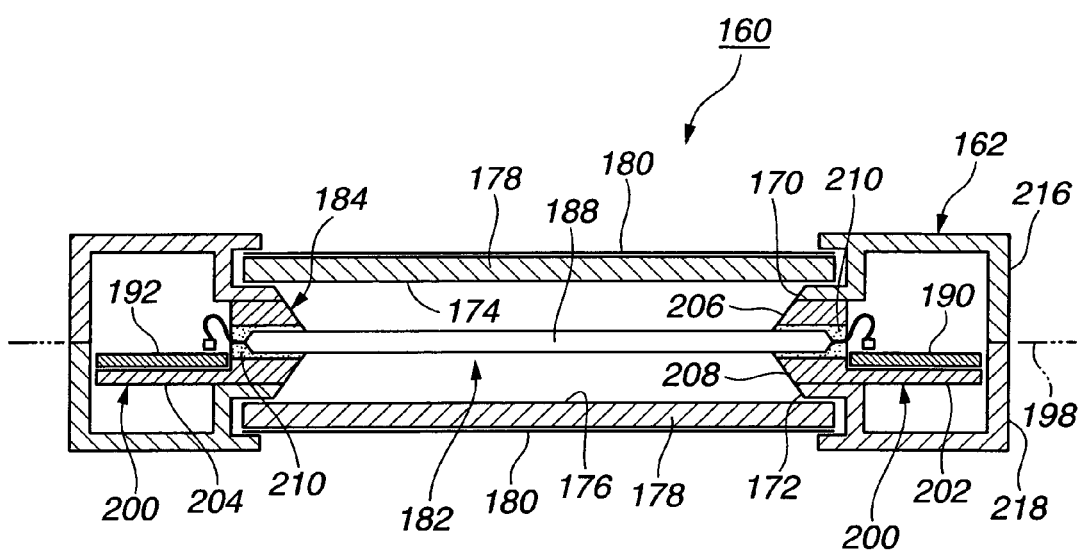
FIG. 4 is a cross section taken though the line 4-4 in FIG. 2 with the bracket inserted into the chassis for installation of a light emitting structure.

Referring also to FIGS. 3 and 4, the backlight unit 160 includes a light emitting structure 182. The light emitting structure 182 may be placed within the bay 164 to light a two-dimensional area on the one side of the at least one optical panel 174 or 176. In the illustrated example, the light emitting structure 182 is placed within the bay 164 between the first and second optical panels 174 and 176. The light emitting structure 182 lights two-dimensional areas on the first and second optical panels 174 and 176 through the respective window openings 170 and 172.

As best seen FIG. 2, the backlight unit 160 includes a bracket 184 for quick installation and removal of the light emitting structure 182 through the aperture 168 to and from the bay 164. In FIG. 2, the bracket 184 is partially removed to show the light emitting structure 182. The bracket 184 includes a support structure 186. The support structure 186 carries the light emitting structure 182 that may include at least one linear light source and a power control circuit coupled thereto. In the illustrated example, the at least one linear light source includes a parallel arrangement of a plurality of linear lamps 188. The power control circuit includes an inverter substrate 190 and a return substrate 192 interconnected by a return cable 192. The inverter and return substrates 190 and 192 are connected across the linear lamps 188. In the illustrated example, at one end, each of the linear lamps 188 is connected to the inverter substrate 190, and at the opposite end, each linear lamp 188 is connected to the return substrate 192.

As best seen in FIG. 4, the support structure 186 includes a frame 196. The frame 196 has a predetermined line 198 and two sides spaced along the predetermined line 198. The support structure 186 also includes a circuit mount 200 including two portions 202 and 204, each extending from one of the two sides of the frame 196 in a remote direction from the other of the two sides. At the two sides, the frame 196 holds two ends of each of the plurality of linear lamps 188, respectively. At the portion 202, the circuit mount 200 holds the inverter substrate 190 of the power control circuit. At the other portion 204, the circuit mount 200 holds the return substrate 192 of the power control circuit.

As readily seen from FIGS. 3 and 4, the frame 196 may be dividable into and include two frame halves, namely a first frame half 206 and a second frame half 208, interposing therebetween the two ends of each of the plurality of linear lamps 188. In the illustrated example, the first and second portions 202 and 204 of the circuit mount are integral portions of the second frame half 208. At least one of the frame halves is formed with a plurality of cutouts over the entire length of each of the two sides. In the illustrated example, each of the first and second frame halves 206 and 208 is formed with a plurality of cutouts over the entire length of each of the two sides. As best seen in FIG. 4, a mount rubber 210 holds one of the two ends of each of the plurality of liner lamps 188 within one of the plurality of cutouts.

Figure 7:
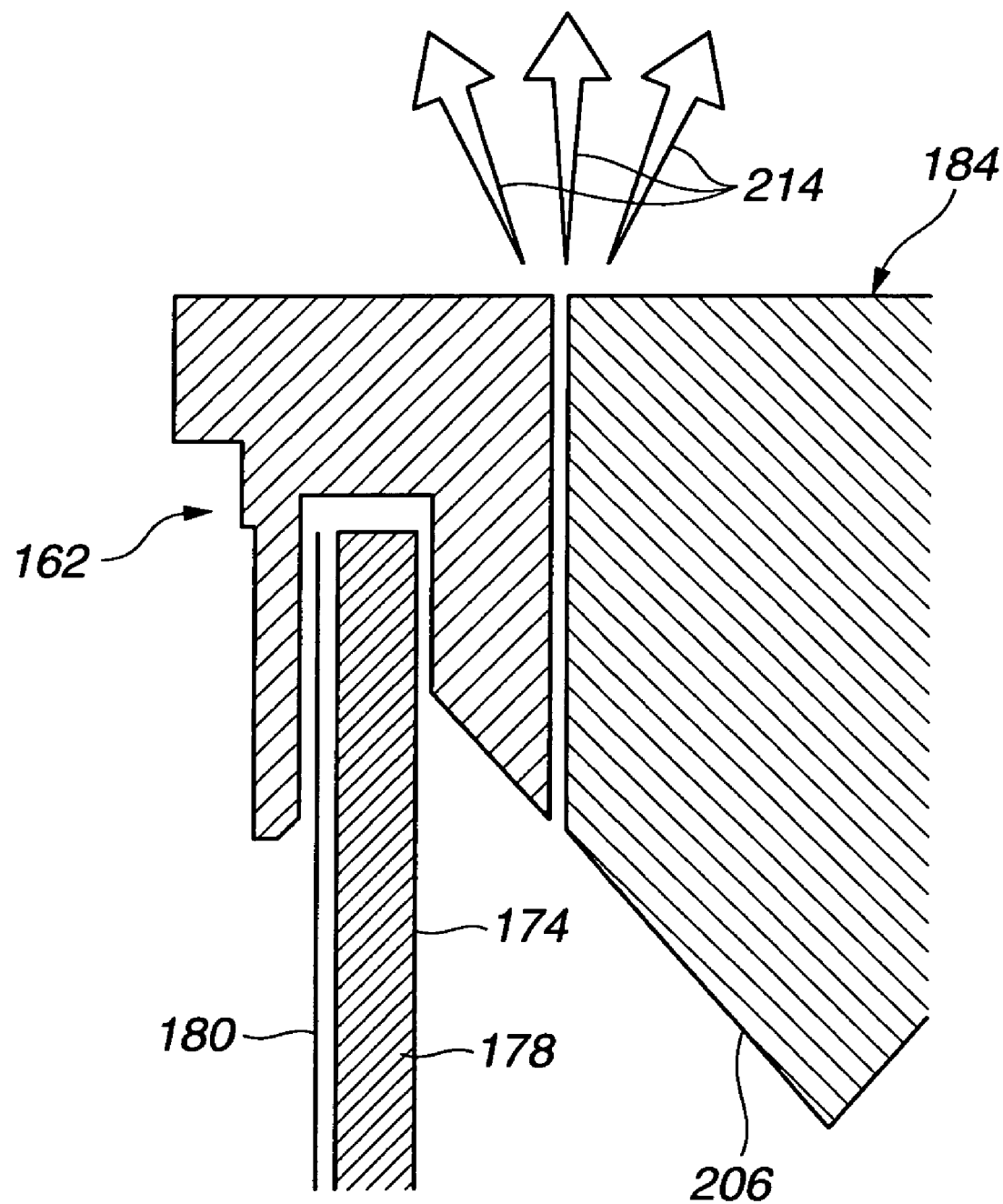
FIG. 7 is an enlarged view of a portion of the backlight unit shown in FIG. 6 with a light shield removed to illustrate light leaked.

Referring back to FIGS. 1 to 3, the bracket 184 includes at least one light prevention feature. In the illustrated example, the at least one light leak prevention feature includes a light shield 212 arranged to cover the aperture 168 when the bracket 184 is positioned for installation of the light emitting structure 182 to the bay 164. Referring to FIG. 7, arrows 214 indicate light, which would leak through a clearance between the chassis 162 and the bracket 184 if the light shield 212 were not provided.

Figure 5:
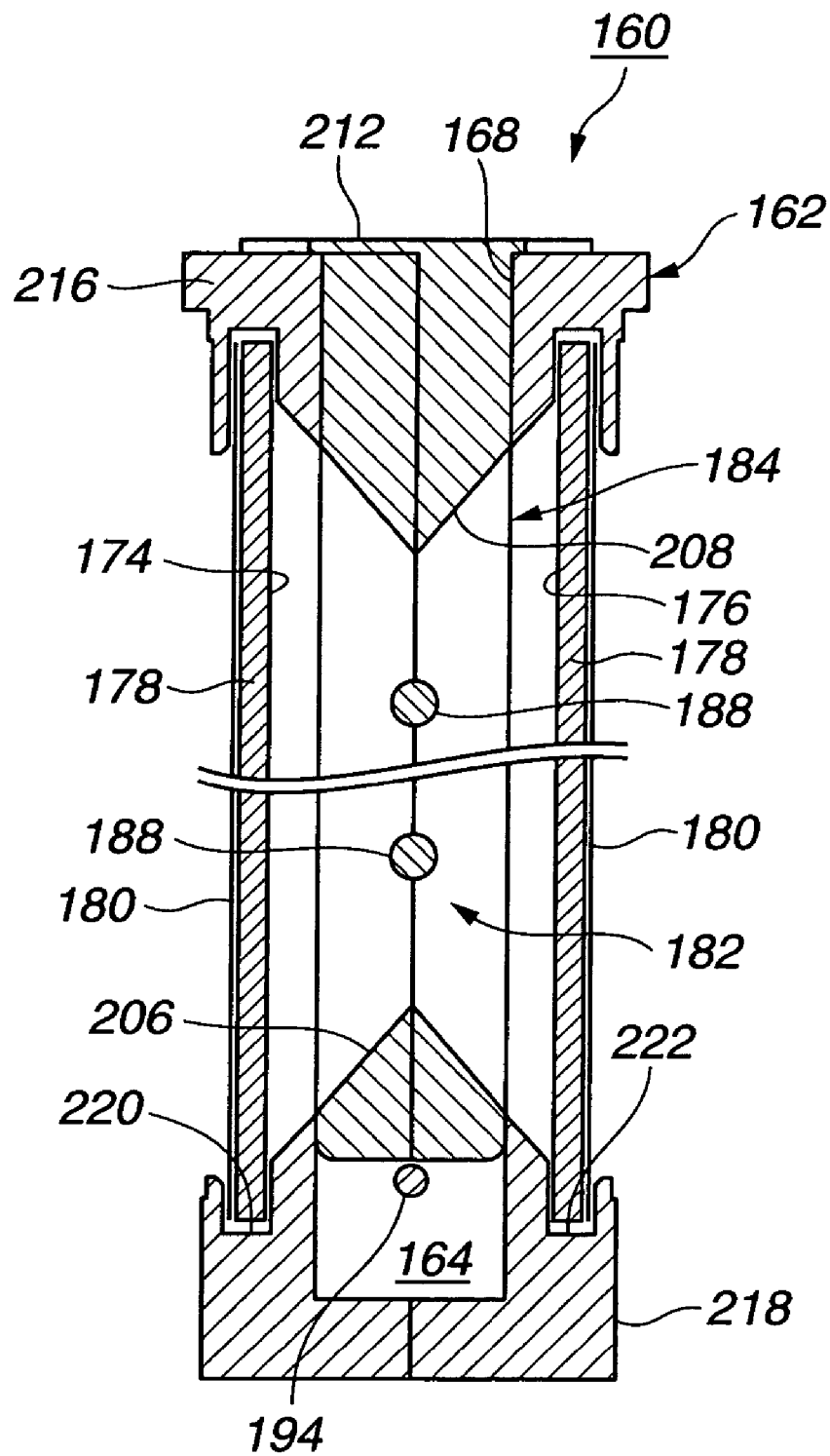
FIG. 5 is a cross section taken through the line 5-5 in FIG. 2 with the bracket inserted into the chassis for installation of the light emitting structure.
Figure 6:
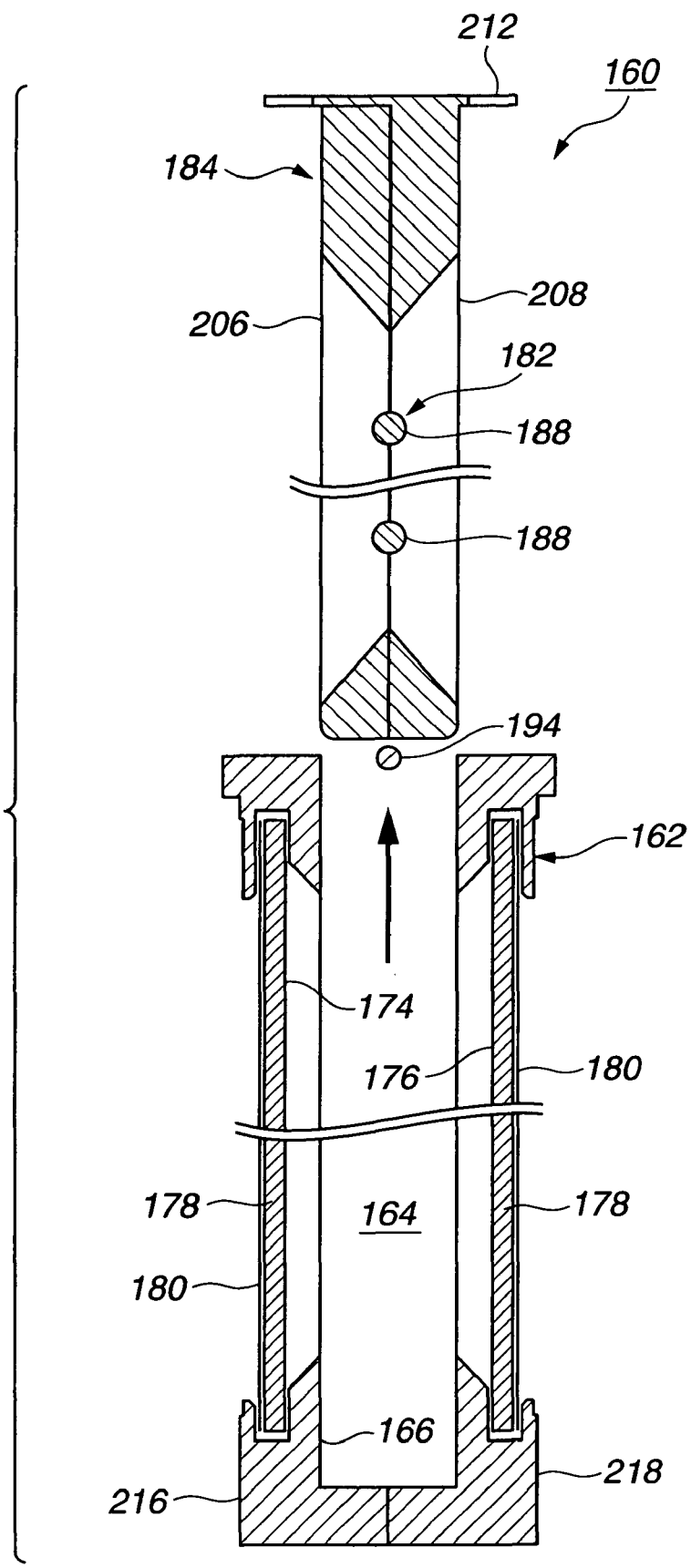
FIG. 6 is a similar view to FIG. 5 with the bracket pulled out of the chassis.

FIG. 5 illustrates the bracket 184 inserted into the chassis 162 and positioned for installation of the light emitting structure 182 to the bay 164. In the illustrated position, the light shield 212 covers the aperture 168. For lamp replacement, the bracket 184 is pulled out of the chassis 162 for removal of the light emitting structure 182 from the bay 164 as illustrated in FIG. 6. The first and second optical panels 174 and 176 are left on the chassis 162 together with the diffusion films 180 when the bracket 184 is pulled out of the chassis 162 for lamp replacement. It is no longer necessary to replace the optical panels and the diffusion films with new ones upon lamp replacement, causing a reduction in maintenance cost. The first and second optical panels 174 and 176 prevent dust and/or foreign particles entrained in ambient air from reaching the LCD panels 146 and 150 when the bay 164 is open to the ambient atmosphere through the aperture 168 for lamp replacement. The bracket 184 slides on the wall means 166 defining the bay 164 during movement between the positions illustrated in FIGS. 5 and 6. The wall means 166 of the chassis 162 cooperate with the bracket 184 to provide smooth guided movement of the bracket 184 for quick installation and removal of the light emitting structure 182 to and from the bay 164. This may be readily seen from FIG. 4.

Referring to FIGS. 1, 3 and 4, the chassis 162 may be dividable into and include two chassis halves, namely a first chassis half 216 and a second chassis half 218. As will be readily seen from FIGS. 1 and 4, the first chassis half 216 is formed with a light management feature holding frame 220 along the edge of the window opening 170, and the second chassis half 218 is formed with a light management feature holding frame 222 along the edge of the window opening 172. The frame 220 of the first chassis half 216 receives the first optical panel 174 and the light diffusing film 180. The frame 222 of the second chassis half 218 receives the second optical panel 176 and the light diffusing film 180. The chassis 162 is produced by assembling the first and second chassis halves 216 and 218 and interlocking them at 224 (see FIG. 1).

Referring now to FIGS. 1, 2 and 3, the first chassis half 216 is formed with four mount posts 118, and the second chassis half 218 four mount posts, not shown. Using the mount posts 226, the first chassis half 216 supports the LCD panel 146 in an appropriate position. Similarly, using the mount posts, not shown, the second chassis half 218 supports the LCD panel 150 in an appropriate position. In cooperation with a first front case 228 and a second front case 230, the first and second chassis halves 216 and 218 hold the LCD panels 146 and 150, respectively. The first and second chassis halves 216 and 218 are structurally strong because of the provision of light management feature holding frames 220 and 222 along the edge of each of the window openings 170 and 172.

In the preceding embodiment of backlight unit 160, the first and second chassis halves 216 and 218 have integral light management feature holding frames 220 and 222, respectively. As such frames 220 and 222 provide grooves with invariable width and depth, the first and second chassis halves 216 and 218 must be replaced by new ones if need arises to hold a different optical panel with increased or decreased width. The first and second chassis halves 216 and 218 must be replaced by new ones if need arises to hold a different optical panel with increased or decreased two-dimensional area.

Figure 8:
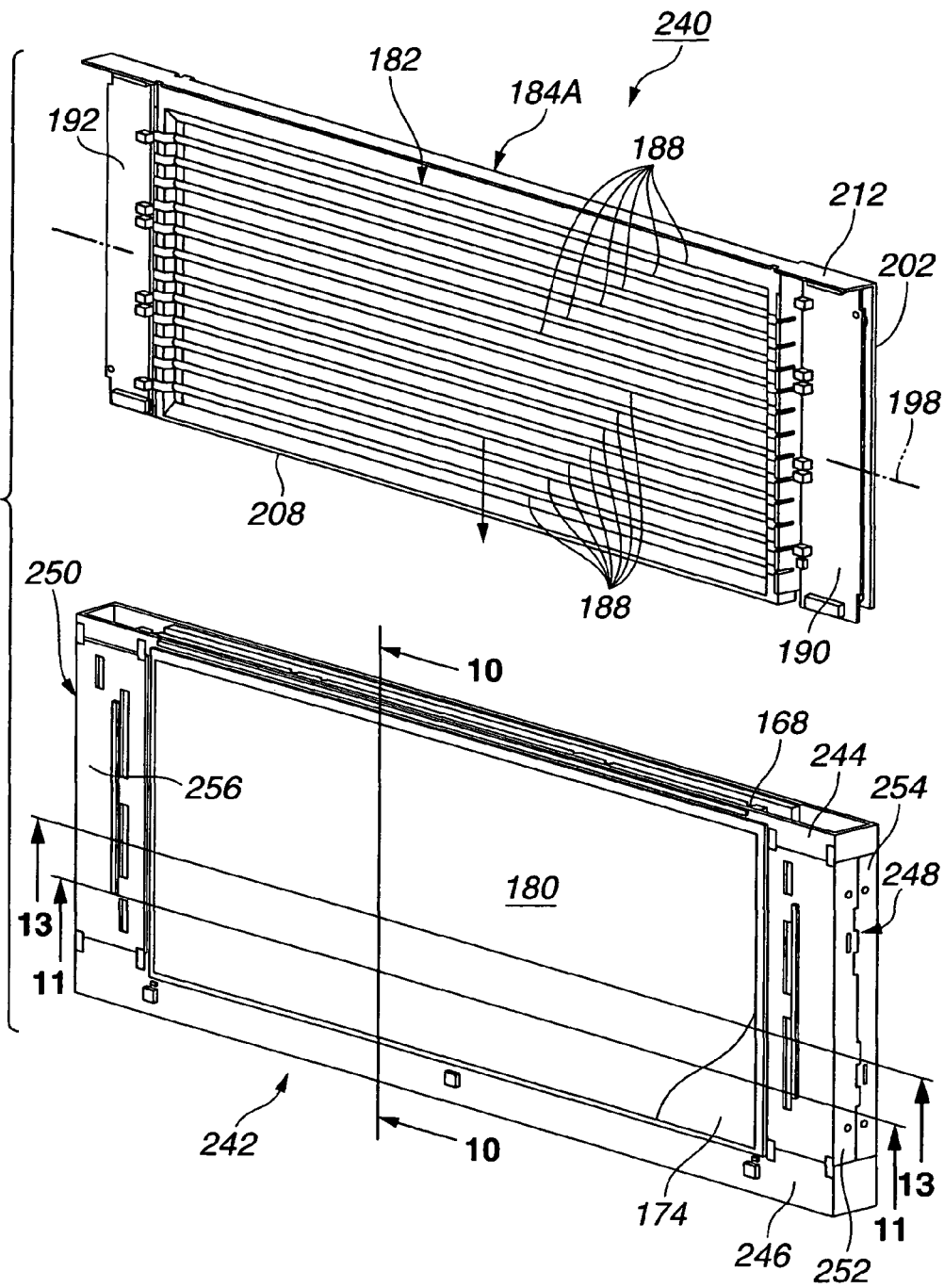
FIG. 8 is a view similar to FIG. 2 showing another embodiment of a backlight unit according to the present invention.
Figure 9:
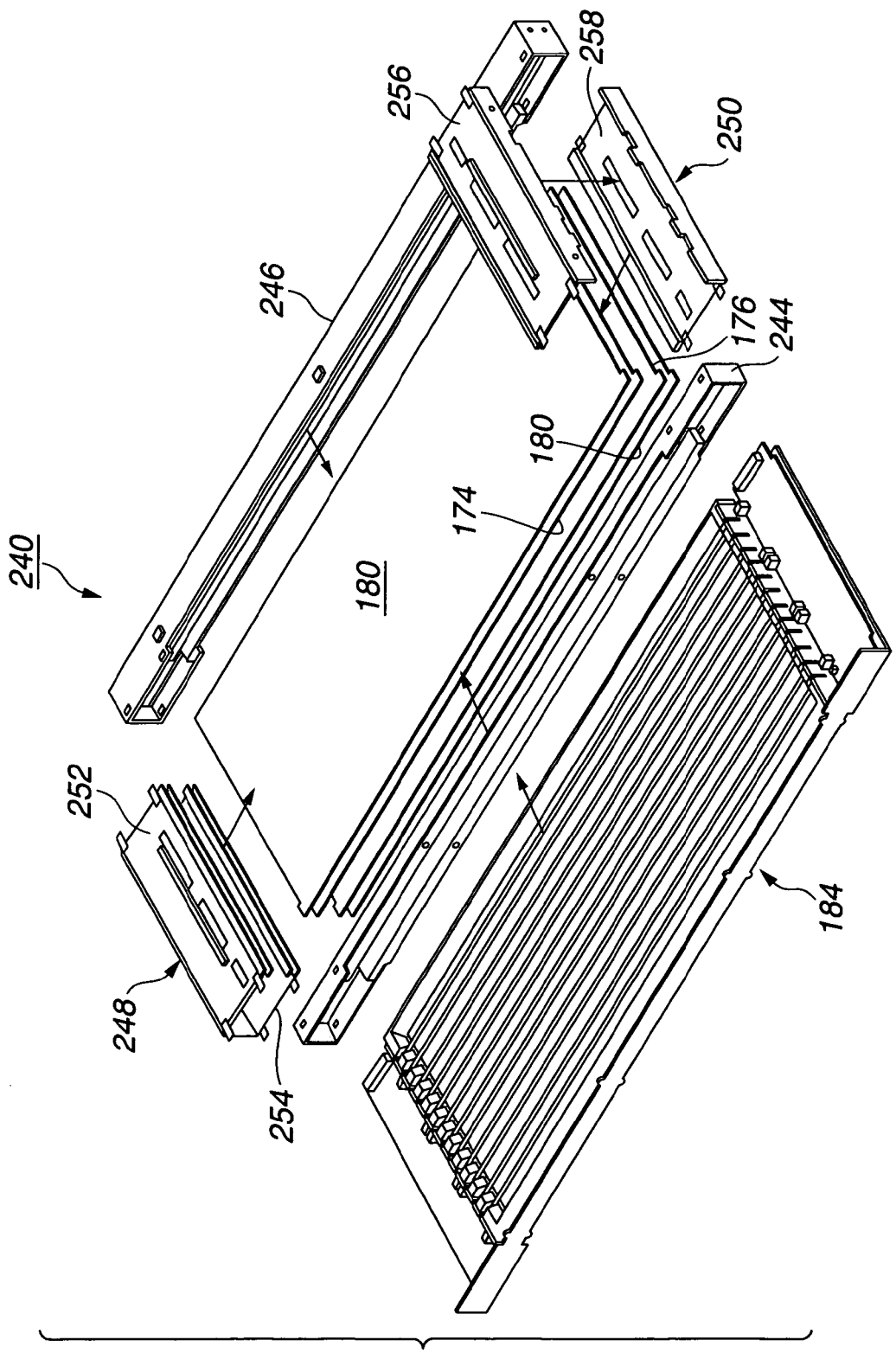
FIG. 9 is perspective view of the backlight unit shown in FIG. 8 with a chassis disassembled into pieces.

Referring to FIGS. 8 to 11, another embodiment of backlight unit 240 is substantially the same as the backlight unit 160. However, the backlight unit 240 is different from the backlight unit 160 in the structure of a chassis 242. As best seen in FIG. 9, the chassis 242 is dividable into four sections, each having at least one frame portion providing a groove receiving one of four sides of an optical panel. The four sections include a top chassis section chassis 244, a bottom section chassis 246, a right side section 248, and a left side section 250. The right side section 248 is dividable into and includes a right side section first half chassis 252 and a right side section second half chassis 254. The left side section 250 is dividable into and includes a left side section first half chassis 256 and a left side section second half chassis 258. As shown in FIG. 9, the chassis 252, 254, 256 and 258 may be of the same design. When assembled as shown in FIG. 8, the top section chassis 244, the right side section first half chassis 252, the bottom section chassis 246, and the left side section first half chassis 256 cooperate to provide a light management feature holding frame 220 (see FIG. 10). The top section chassis 244, the right side section second half chassis 254, the bottom section chassis 246, and the left side section second half chassis 258 cooperate to provide a light management feature holding frame 222 (see FIG. 10). The frame 220 provides a groove for receiving a first optical panel 174 with a light diffusing film 180. The frame 222 provides a groove for receiving a second optical panel 176 with a light diffusing film 180. The width and depth of the grooves of the frames 200 and 222 may be chosen to fit close to the optical panel 174 or 176 and the light diffusing film 188 because the chassis 242 are divided into a plurality sections along the periphery of the optical panel 174 or 176. Thus, the chassis 242 provides a stronger grip on the optical panel than the chassis 162 does.

As is readily seen from FIG. 9, the top section chassis 244 and the bottom section chassis 246 are single integral pieces, respectively. Thus, the chassis 242 is structurally stronger than the chassis 162.

The backlight unit 240 is different from the backlight unit 160 in that the light leak prevention feature includes a second light shield 270 arranged to cover a clearance between a frame 196 of a support structure 186 of a bracket 184 and a guide 272 of the chassis 242. It is to be noted that such light shield is provided on each of first and second 202 and 204 of a circuit mount 200. As they are in engagement with the adjacent walls of the chassis 242, undesired movement of the bracket 184 along a predetermined line 198 relative to the chassis 242 is prevented. Besides, as they slide on the adjacent walls, the second light shield 270 provides accurate smooth movement along the guide 272 during insertion of the bracket 184 into the chassis 242.

Figure 10:
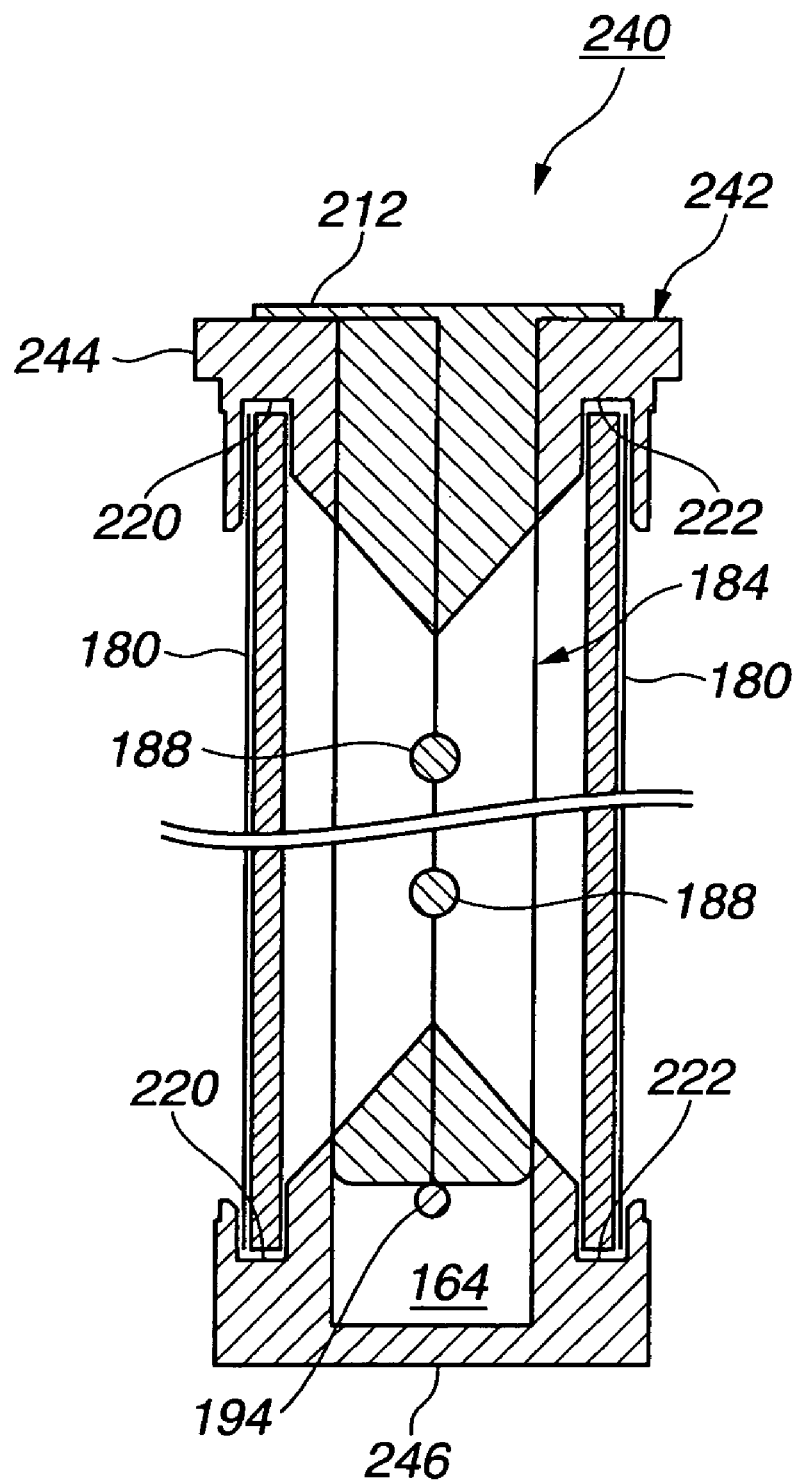
FIG. 10 is a cross section taken through the line 10-10 in FIG. 8 with a bracket inserted into the chassis.
Figure 11:
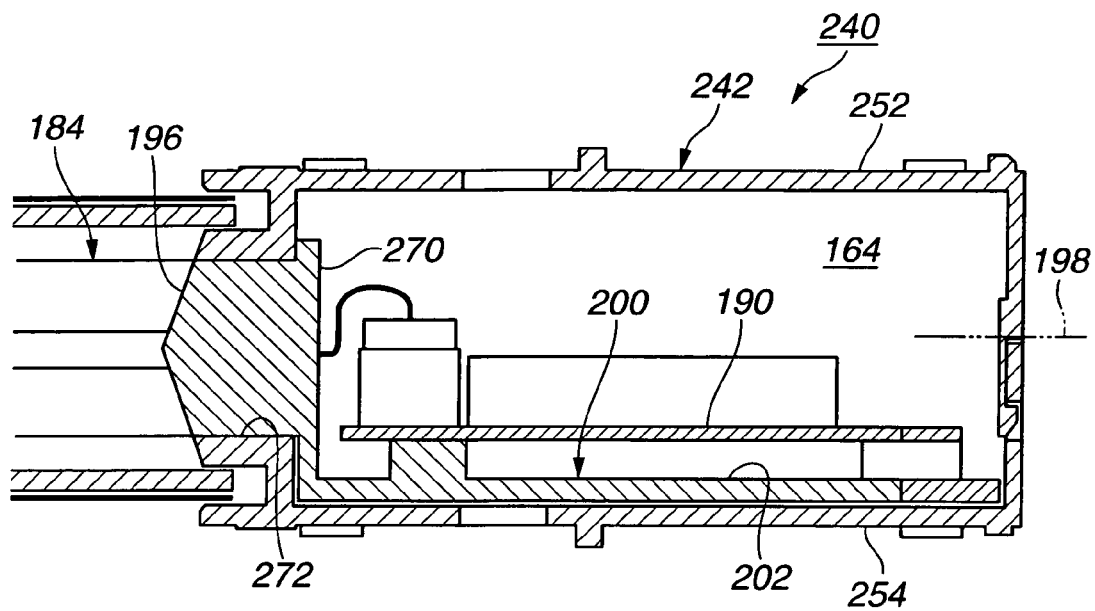
FIG. 11 is a portion of a cross section taken through the line 11-11 in FIG. 8 with the bracket inserted into the chassis, illustrating a light leak prevention feature in the form of a light shield arranged to cover a clearance between a frame of a support structure of the bracket and guide of the chassis

Referring to FIGS. 10 and 11, a bay 164 within the chassis 242 includes a first region for receiving the frame 196 of the support structure 186 of the bracket 184. The bay 164 also includes two second regions for receiving the two portions 202 and 204 of the circuit mount 200 of the support structure 186 of the bracket 184, respectively. As will be seen from FIG. 11, the first region includes guide spaces defined by the guide 272. The guide spaces are open to the second regions, respectively. The second regions are greater in width than the guide spaces. The frame 196 of the support structure 186 of the bracket 184 within the guide 272 defines within each of the guide spaces the clearance. The support structure 186 of the bracket 184 includes the second light shield 270 between each of the two sides of the frame 196 and the adjacent one of the two portions 202 and 204 of the circuit mount 200.

Figure 12:
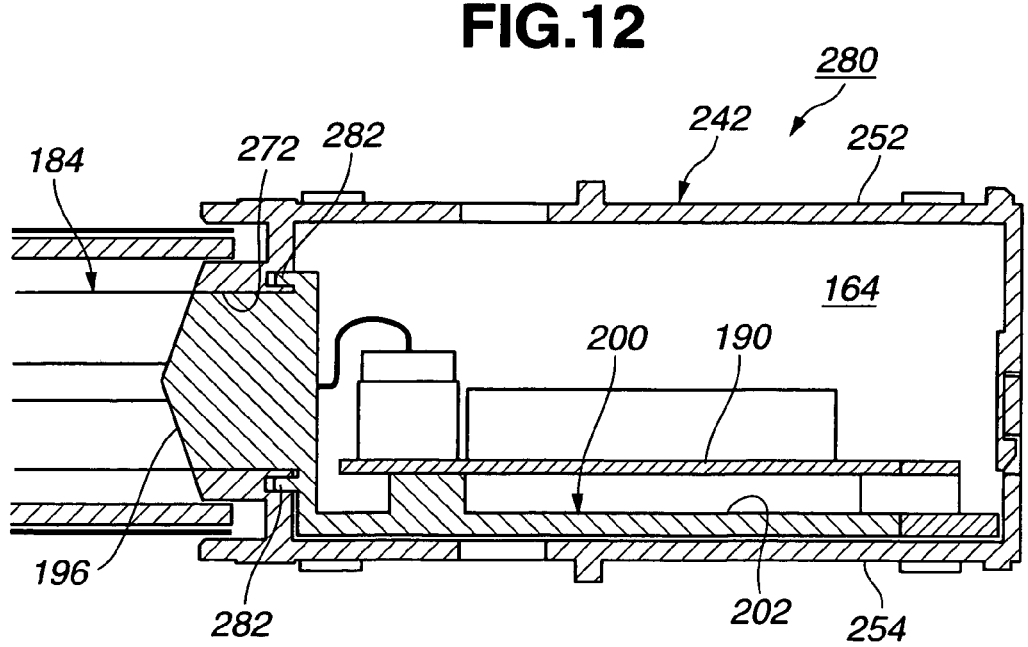
FIG. 12 is a similar view to FIG. 11, illustrating the light leak prevention feature with protrusion and groove means for bringing the bracket into firm engagement with the chassis by preventing components of the chassis from separating.
Figure 13:
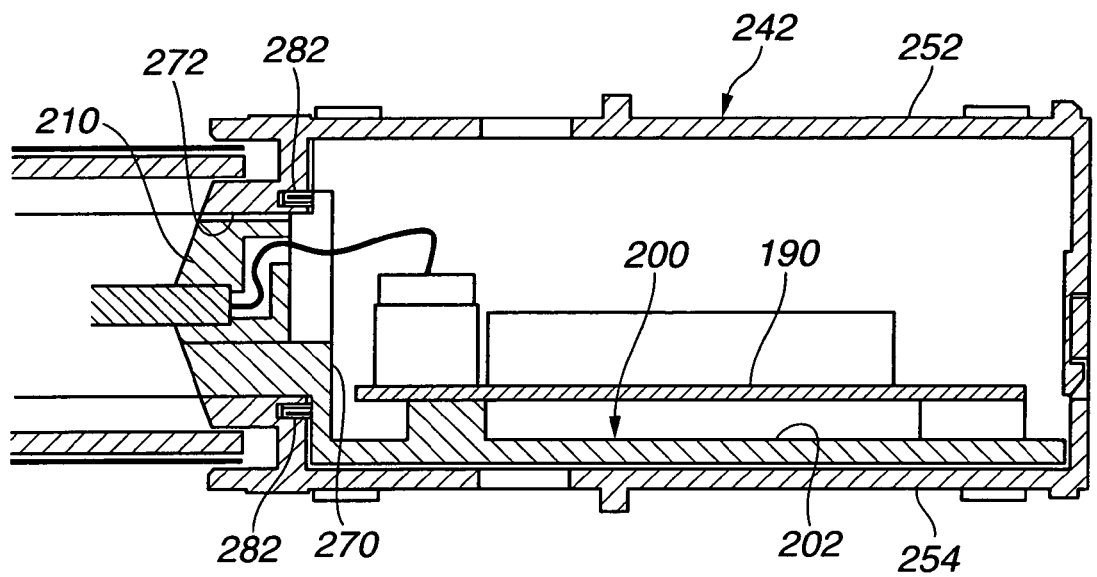
FIG. 13 is a portion of a cross section taken through the line 13-13 in FIG. 8, illustrating the light leak prevention feature shown in FIG. 12.

Referring to FIGS. 12 and 13, another embodiment of backlight unit 280 is substantially the same as the backlight unit 240 shown in FIGS. 8 to 11. The backlight unit 280 is different from the backlight unit 240 in that a chassis 242 and a support structure 186 of a bracket 184 include protrusion and groove means 282 for bringing the bracket 184 into firm engagement with the chassis 242. In the illustrated example, the protrusion and groove means 282 include protrusions on a second light shield 270 and grooves formed into the adjacent wall of a chassis 242. The protrusion and groove means 282 prevents components of the chassis 242 from separating, to thereby bring the bracket 184 into firm engagement with the chassis 242. This measure is effective to prevent the clearance from increasing.

Figure 23:
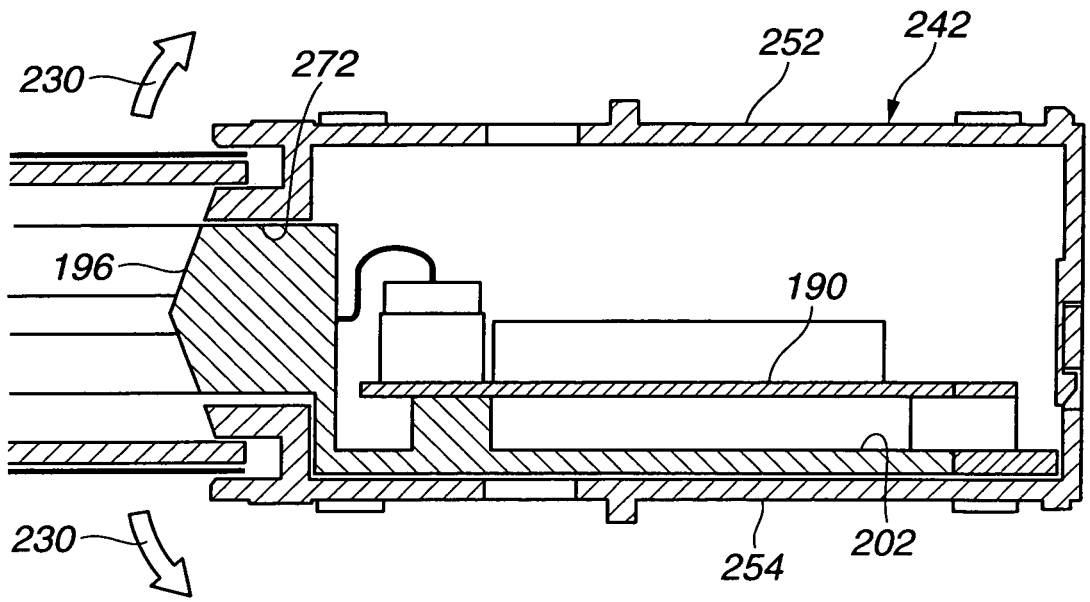
FIG. 23 illustrates in an exaggeration manner components of a chassis separating from each other.

FIG. 23 illustrates such undesired separation of components of the chassis 242 as indicated by arrows 230. This illustrated trend is considered to grow as the size of display grow bigger and bigger.

Figure 14:
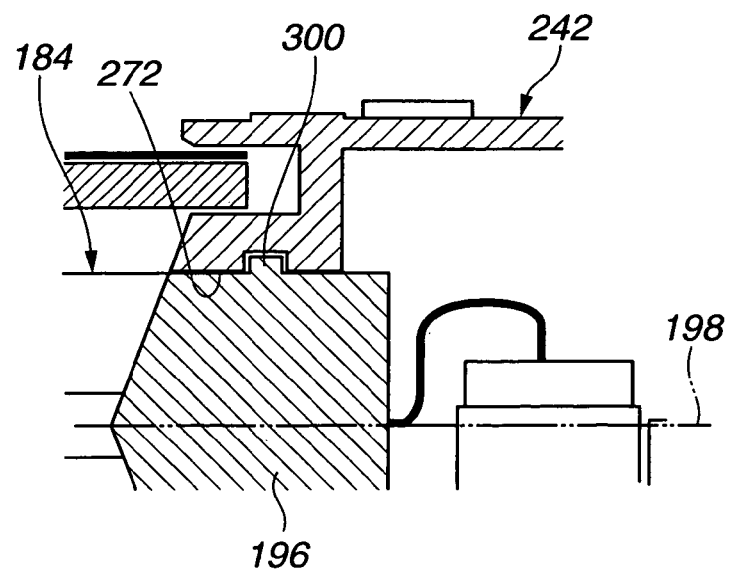
FIG. 14 is a fragmentary cross section, illustrating protrusion and groove means for preventing leak of light and bringing a bracket into firm engagement with a chassis by preventing a bracket from moving relative to a chassis in an undesired direction.

FIG. 14 illustrates protrusion and groove means 300 for preventing leak of light and preventing a bracket 184 from moving relative to a chassis 242 along a predetermined line 198. In this case, the protrusion and groove means 300 does not prevent the components of the chassis 242 form separating. The protrusion and groove means 300 include a protrusion lying over the entire length of the frame 196 and received by a groove formed into the guide 272.

Figure 15:
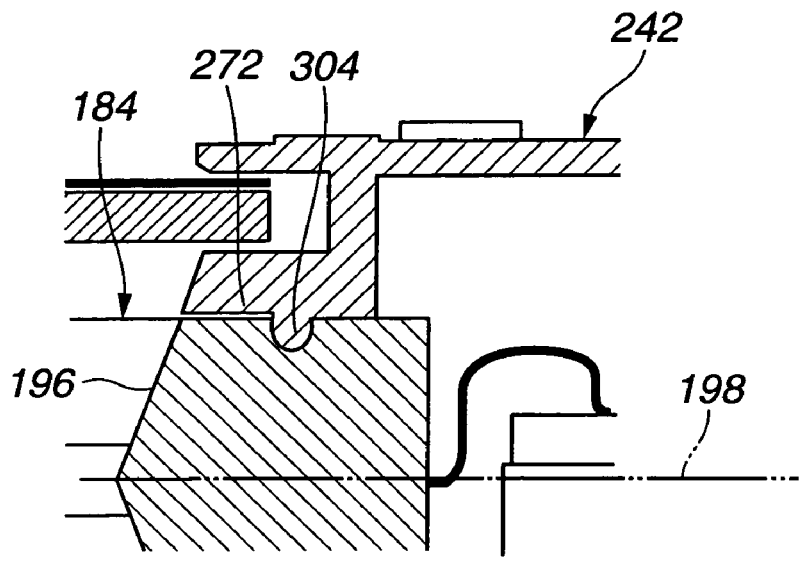
FIGS. 15-22 illustrate other forms of means, including a light leak prevention feature, for bringing a bracket into firm engagement with a chassis by preventing a bracket from moving relative to a chassis in an undesired direction and/or preventing components of the chassis from separating from each other.

FIG. 15 illustrates protrusion and groove means 304 for preventing leak of light and preventing a bracket 184 from moving relative to a chassis 242 along a predetermined line 198. In this case, the protrusion and groove means 304 does not prevent the components of the chassis 242 form separating. The protrusion and groove means 304 include a protrusion lying over the entire length of the guide 272 and received by a groove formed into the frame 196. The cross sectional profile of the protrusion is rounded.

Figure 16:
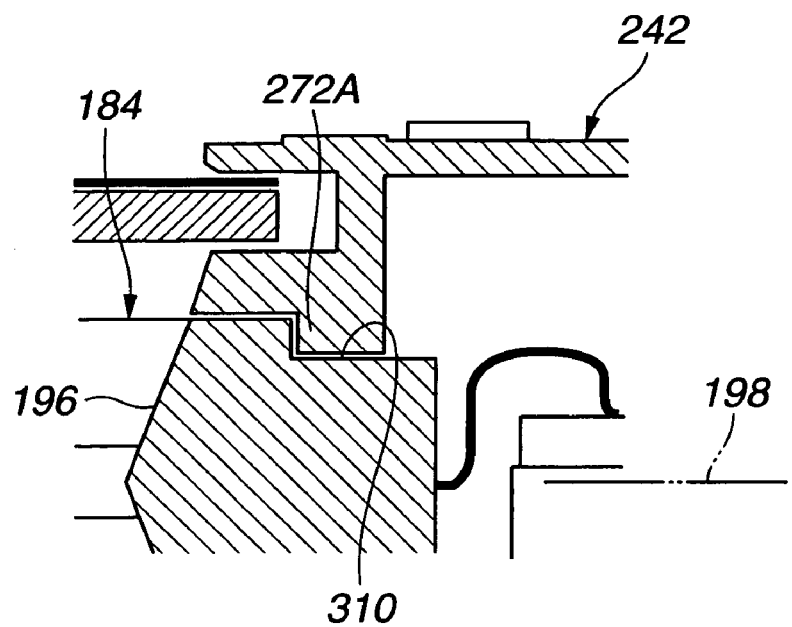

FIGS. 15-22 illustrate various forms of means, including a light leak prevention feature, for bringing a bracket into firm engagement with a chassis by preventing a bracket from moving relative to a chassis in an undesired direction and/or preventing components of the chassis from separating from each other FIG. 16 illustrates a modified guide 272A by providing a reduced width portion 310 to provide a light leak prevention feature and to prevent a bracket 184 from moving relative to a chassis 242 along a predetermined line 198. The reduced width portion 310 is provided by a reduced width portion of a frame 196 in sliding engagement with a reduced width guide portion.

Figure 17:
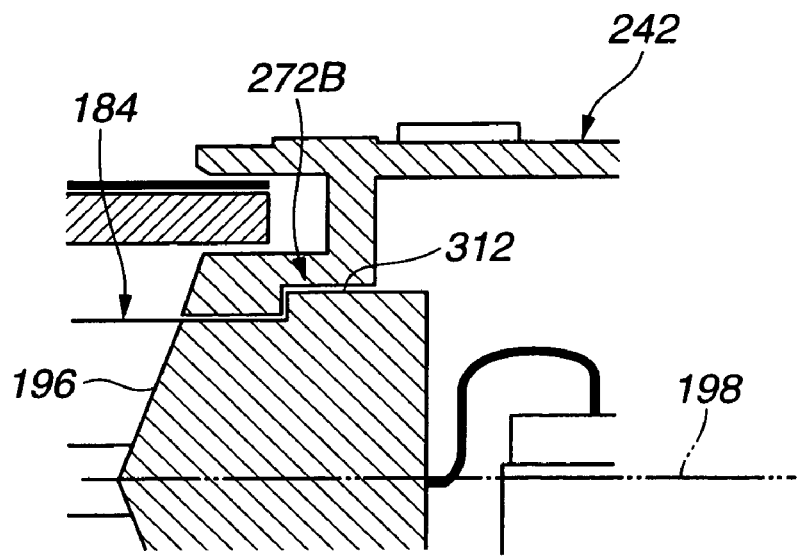

FIG. 17 illustrates a modified guide 272B by providing an enlarged width portion 312 to provide a light leak prevention feature and to prevent a bracket 184 from moving relative to a chassis 242 along a predetermined line 198. The enlarged width portion 312 is provided by an enlarged width portion of a frame 196 in sliding engagement an enlarged width guide portion.

Figure 18:
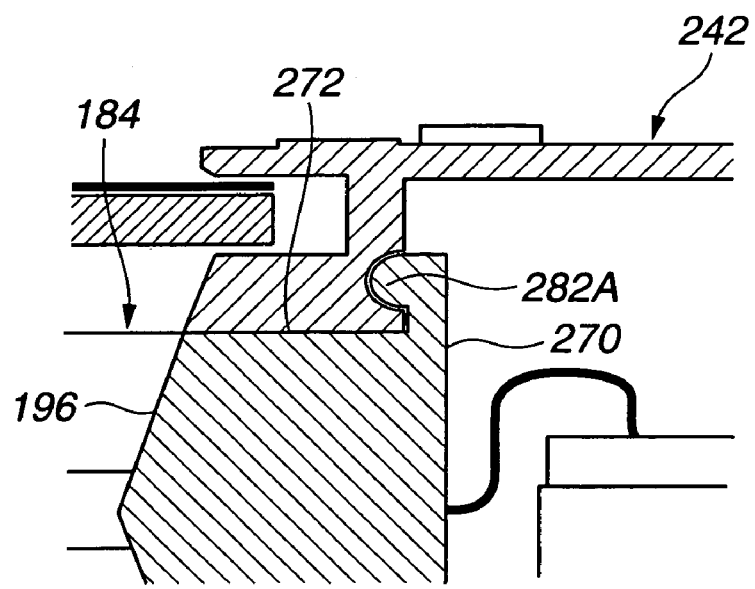

FIG. 18 illustrates a modification of FIGS. 12 and 13. In FIG. 18, protrusion and groove means 282A on a light shield 270 include rounded protrusions. Use of such protrusions provides smooth movement of a bracket 184 into and out of a chassis 242.

Figure 19:
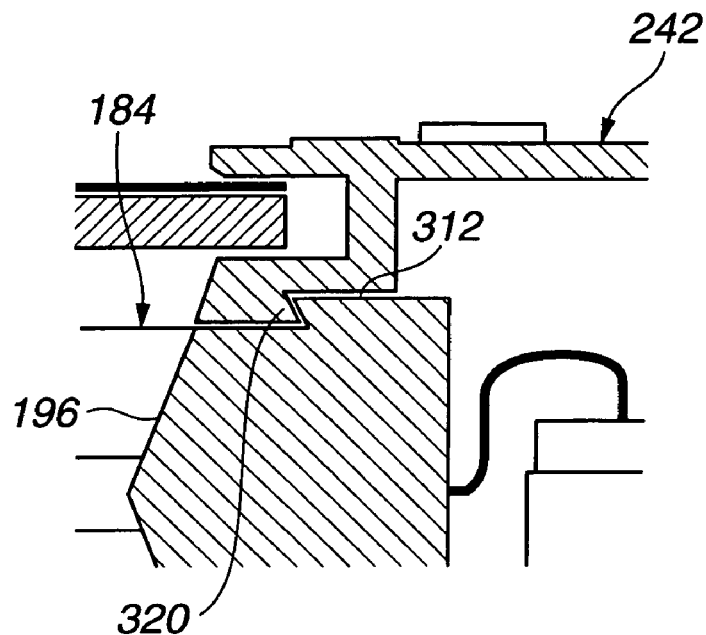

FIG. 19 illustrates a modification of FIG. 17. In FIG. 19, an enlarged width portion 312 is connected to normal width remaining portion via a steep angled shoulder 320. With this steep angled shoulder 320, separation of components of a chassis 242 is also suppressed.

Figure 20:
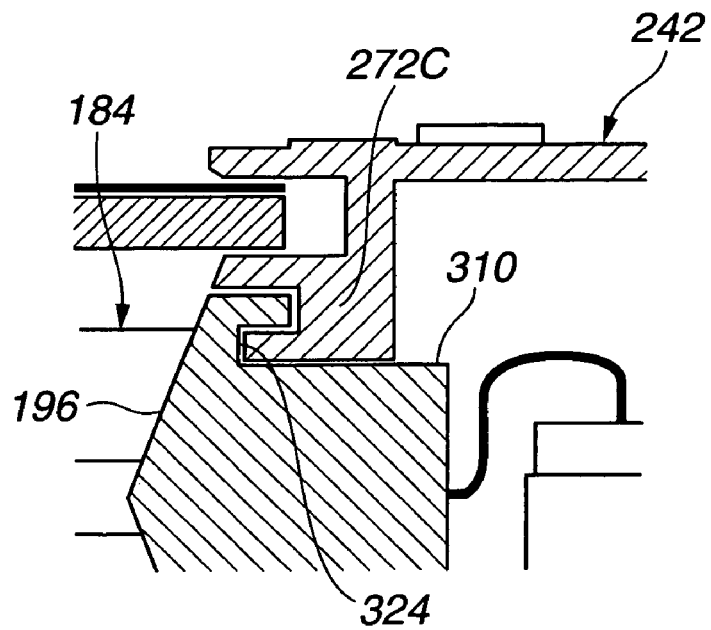

FIG. 20 illustrates a modification of FIG. 16. In FIG. 20, a reduced width portion 310 is connected to normal width remaining portion via a shoulder that is grooved at 324 to receive an integral protrusion 326 of a guide 272C. With this structure, separation of components of a chassis 242 is also suppressed.

Figure 21:
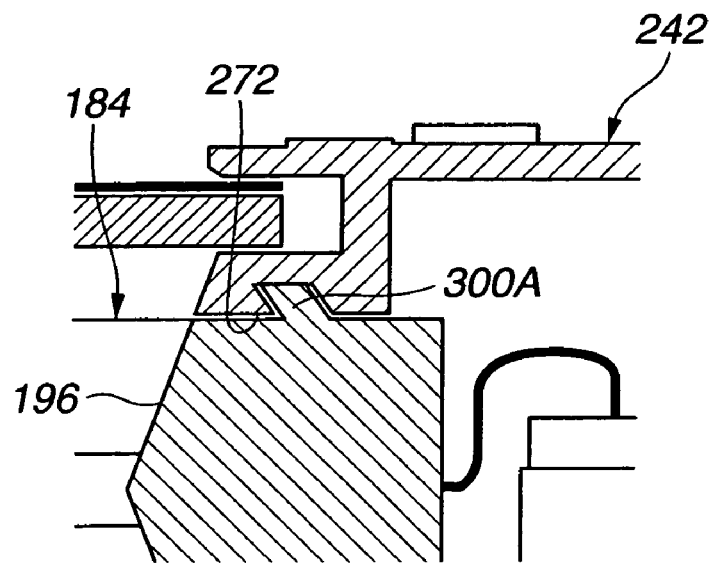
Figure 22:
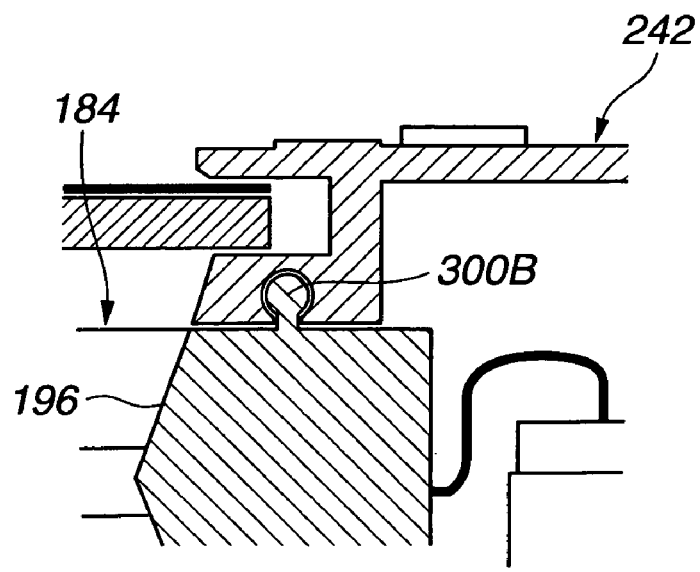

FIG. 21 illustrates a modification of FIG. 14. In FIG. 21, a protrusion 300A has a parallelogram cross sectional profile. FIG. 22 illustrates another modification of FIG. 14. In FIG. 22, a protrusion 300B has a spherical cross sectional profile. Employing such cross sectional profile makes it possible to suppress separation of components of a chassis 242.

Figure 24:
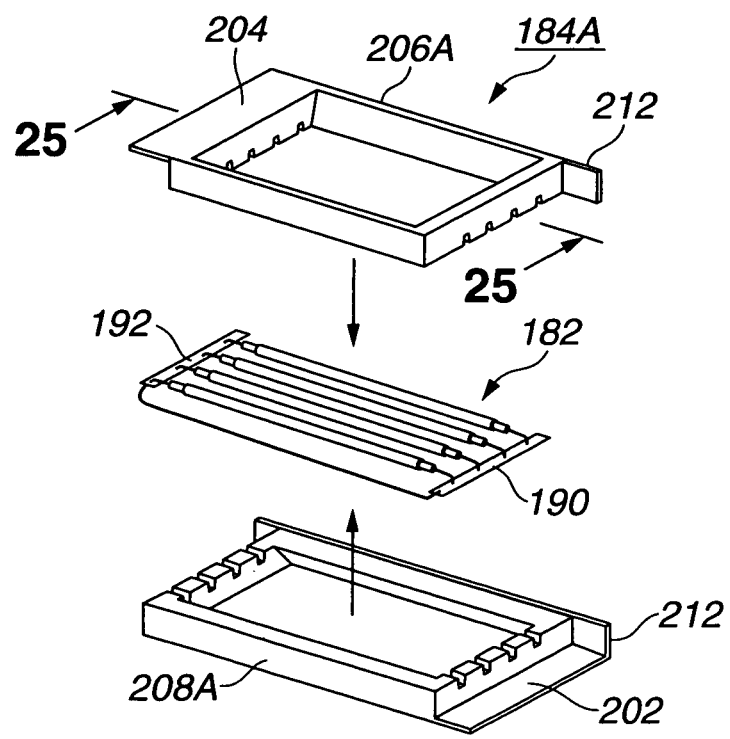
FIG. 24 is an exploded view of another form of a bracket for a backlight unit.
Figure 25:
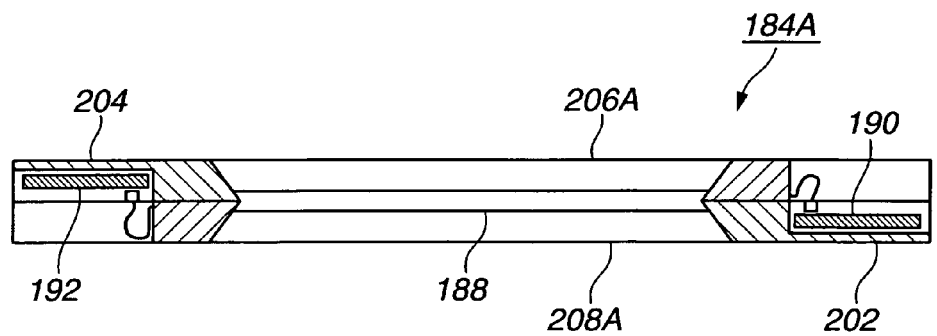
FIG. 25 is longitudinal a cross section taken though FIG. 24 with the components assembled.

FIGS. 24 and 25 illustrate another form of bracket 184A. This bracket 184A is less expensive to fabricate than the bracket 184 previously described. The bracket 184A is substantially the same as the bracket 184 except that two frame halves 206A and 208A interposing therebetween a light emitting structure 182 are of the identical structure. The number of metal molds may be reduced. As will be readily seen from FIG. 24, a first portion 202 and a second portion 204 of a circuit mount 200 are integral parts of the two frame halves 206A and 208A, respectively. This makes it possible to fabricate the frame halves within a single set of metal mount. As seen in FIG. 25, an inverter substrate 190 mounted to the first portion 202 and a return substrate 192 mounted to the second portion 204 do not stay in the same plane.

Figure 26:
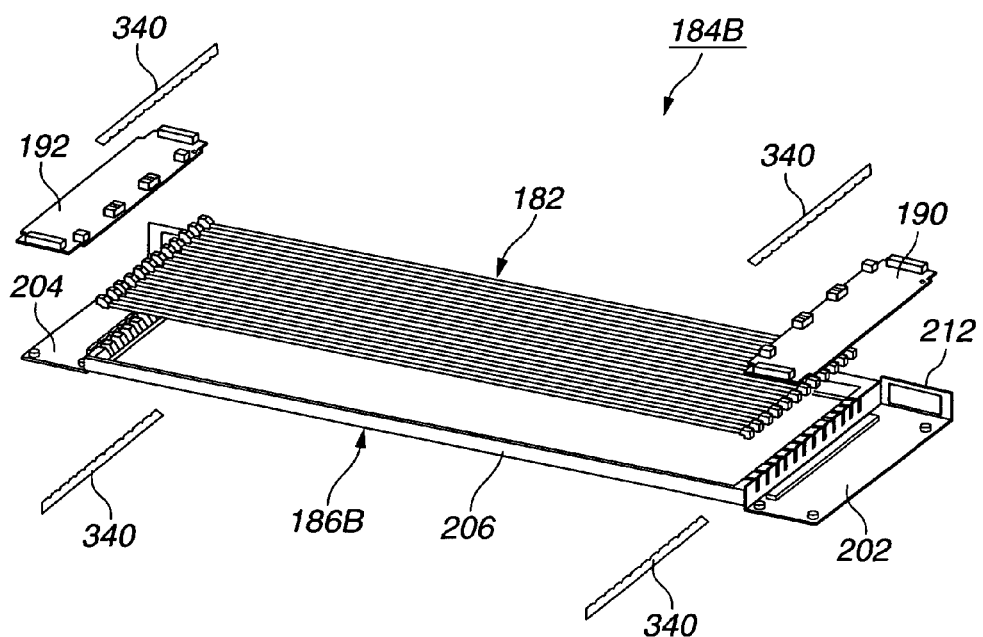
FIG. 26 is an exploded view of another form of a bracket.
Figure 27:
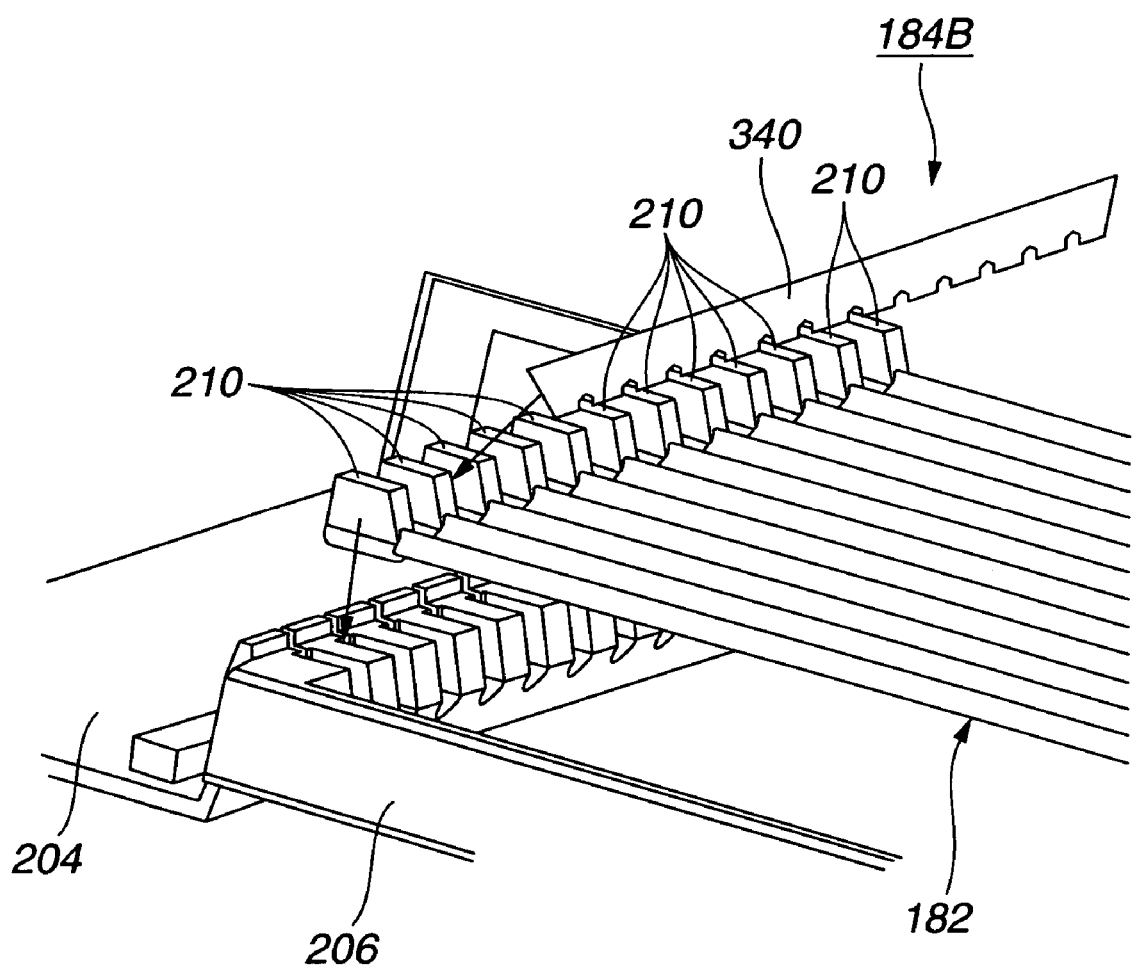
FIG. 27 is an enlarged perspective view of FIG. 26.

FIGS. 26 and 27 illustrate another form of bracket 184B. This bracket 184B is different from the previously described brackets 184 and 184A in that a support structure 186B includes a first frame half 206 only. Light inflecting sheets 340 are used to fixedly connect mount rubbers 210 to the first frame half 206 as shown in FIG. 27.

Figure 28:
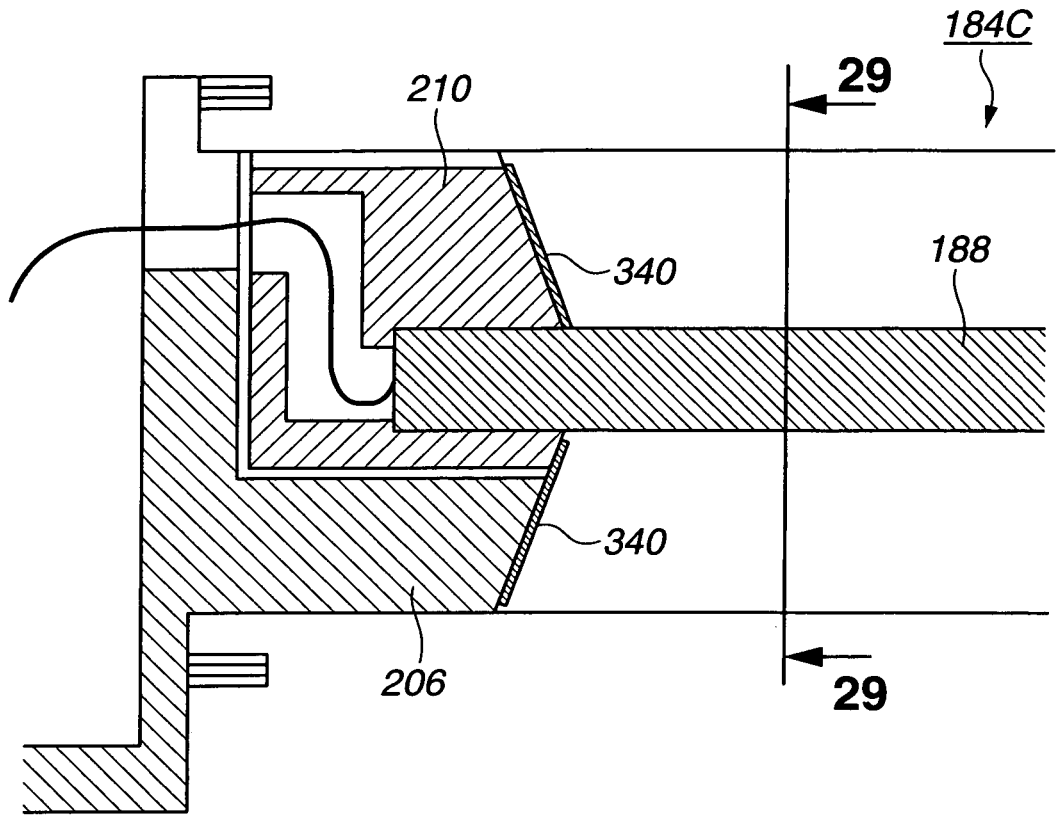
FIG. 28 is an enlarged longitudinal cross section of a portion of another form of a bracket.
Figure 29:
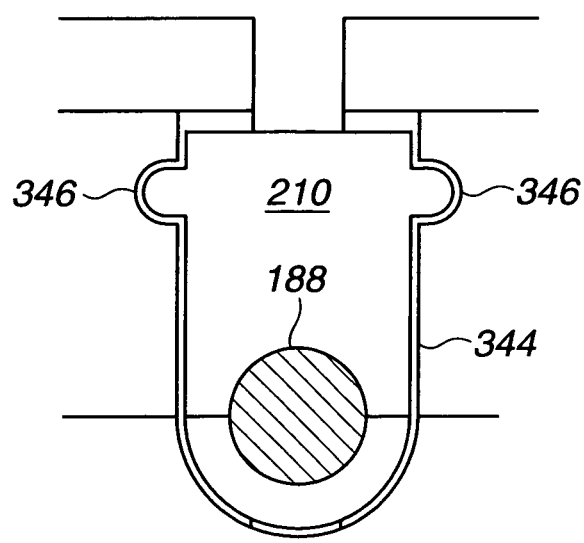
FIG. 29 is a cross section taken through the line 29-29 in FIG. 28.
Figure 30:
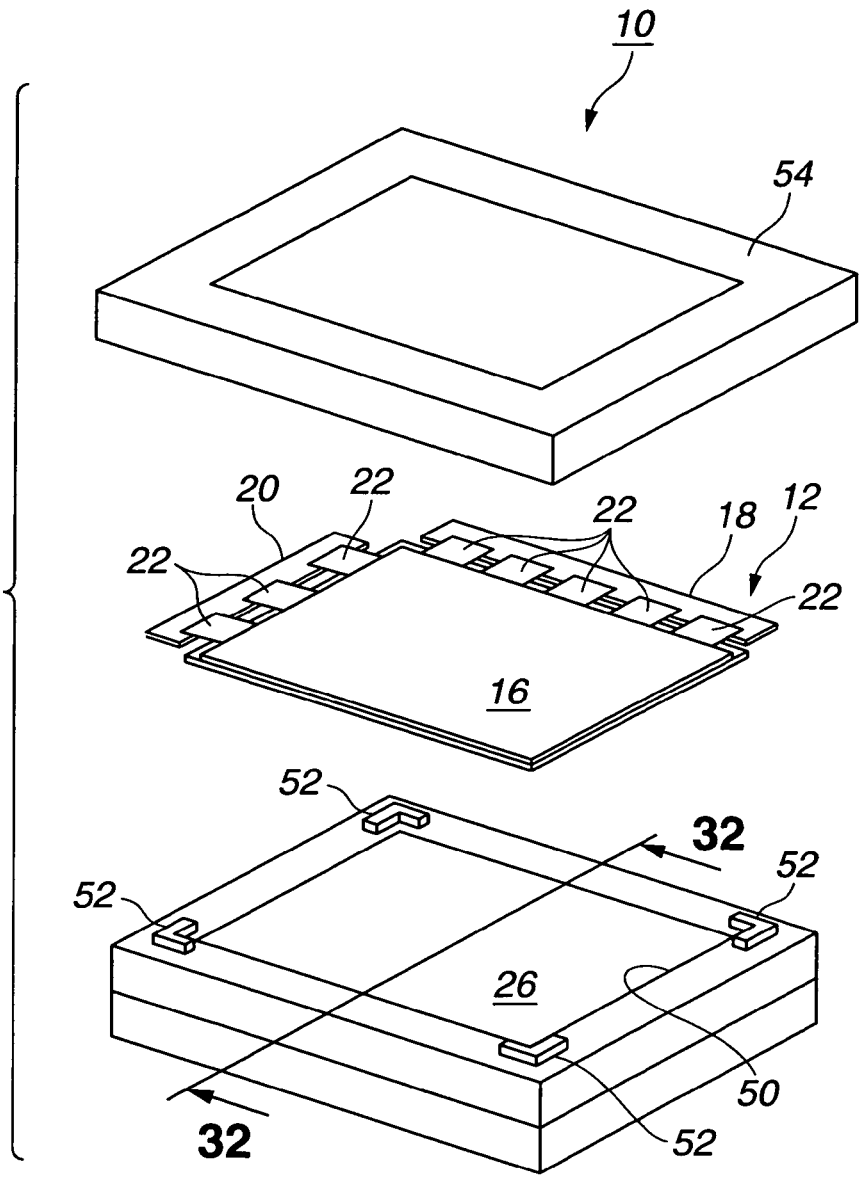
FIG. 30 is an exploded view of a conventional display device.
Figure 31:
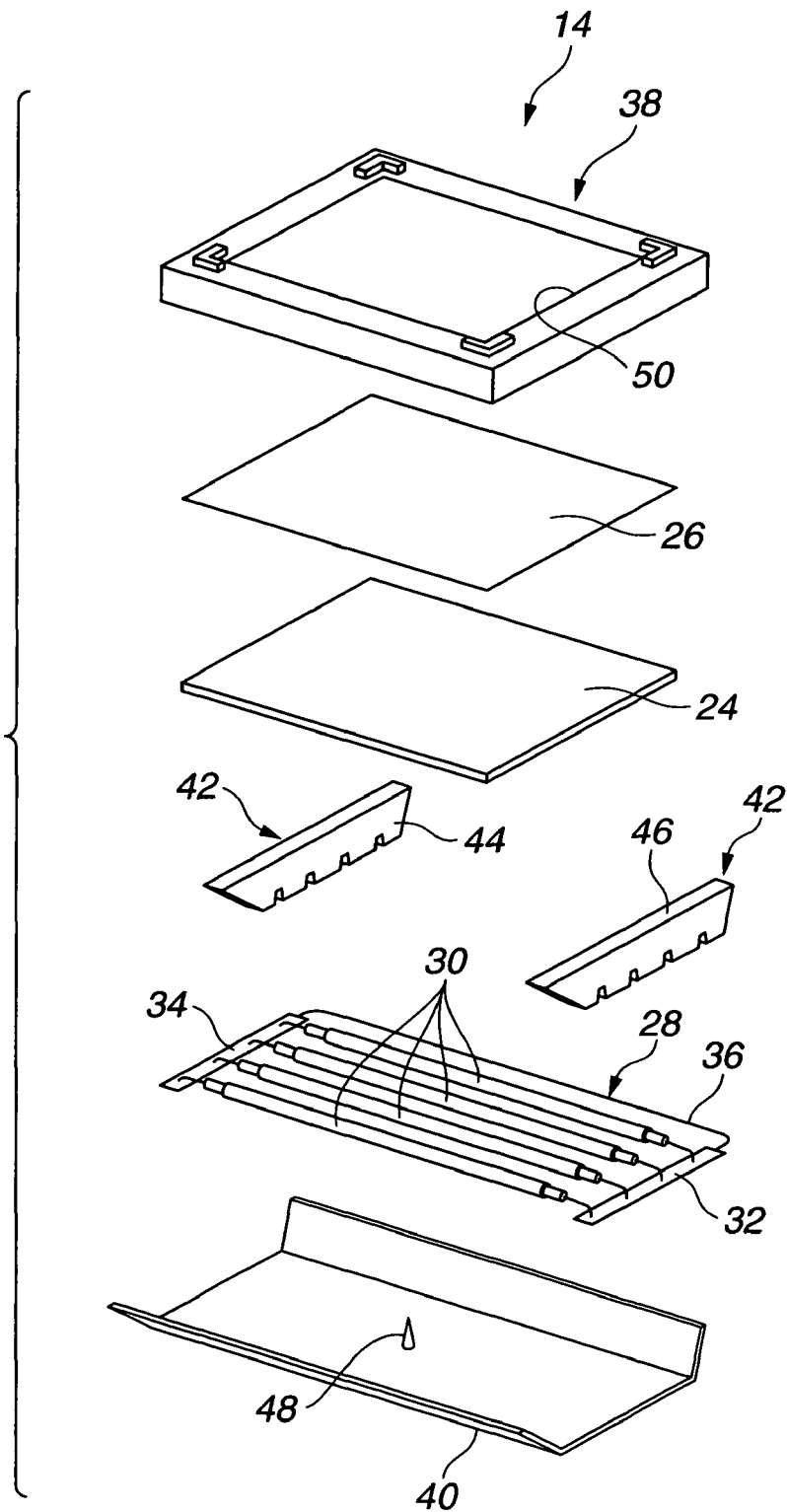
FIG. 31 is an exploded view of a backlight unit of the display device.
Figure 32:
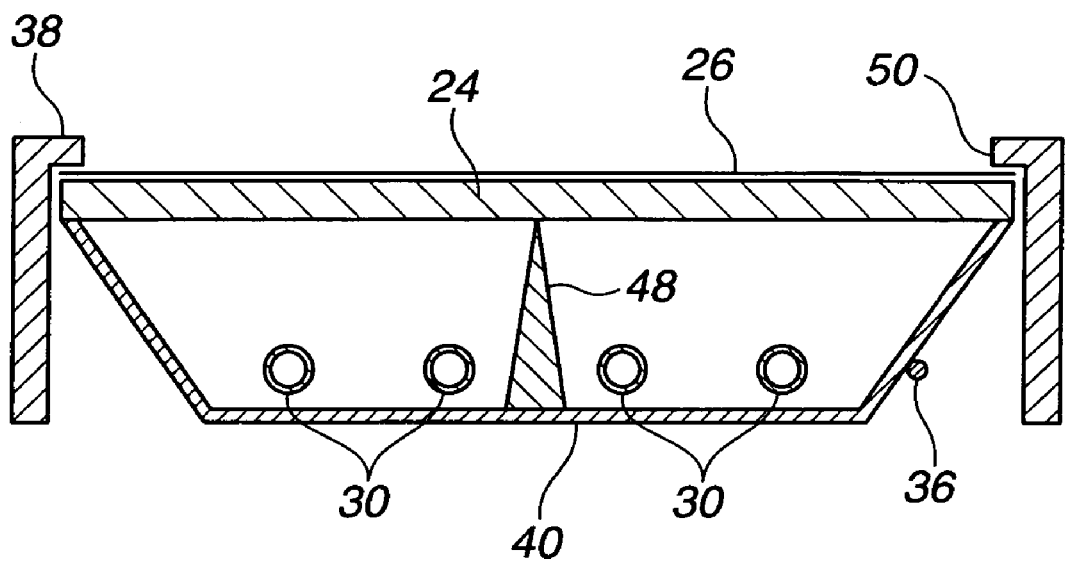
FIG. 32 is a cross section taken through the line 32-32 in FIG. 30.
Figure 33:
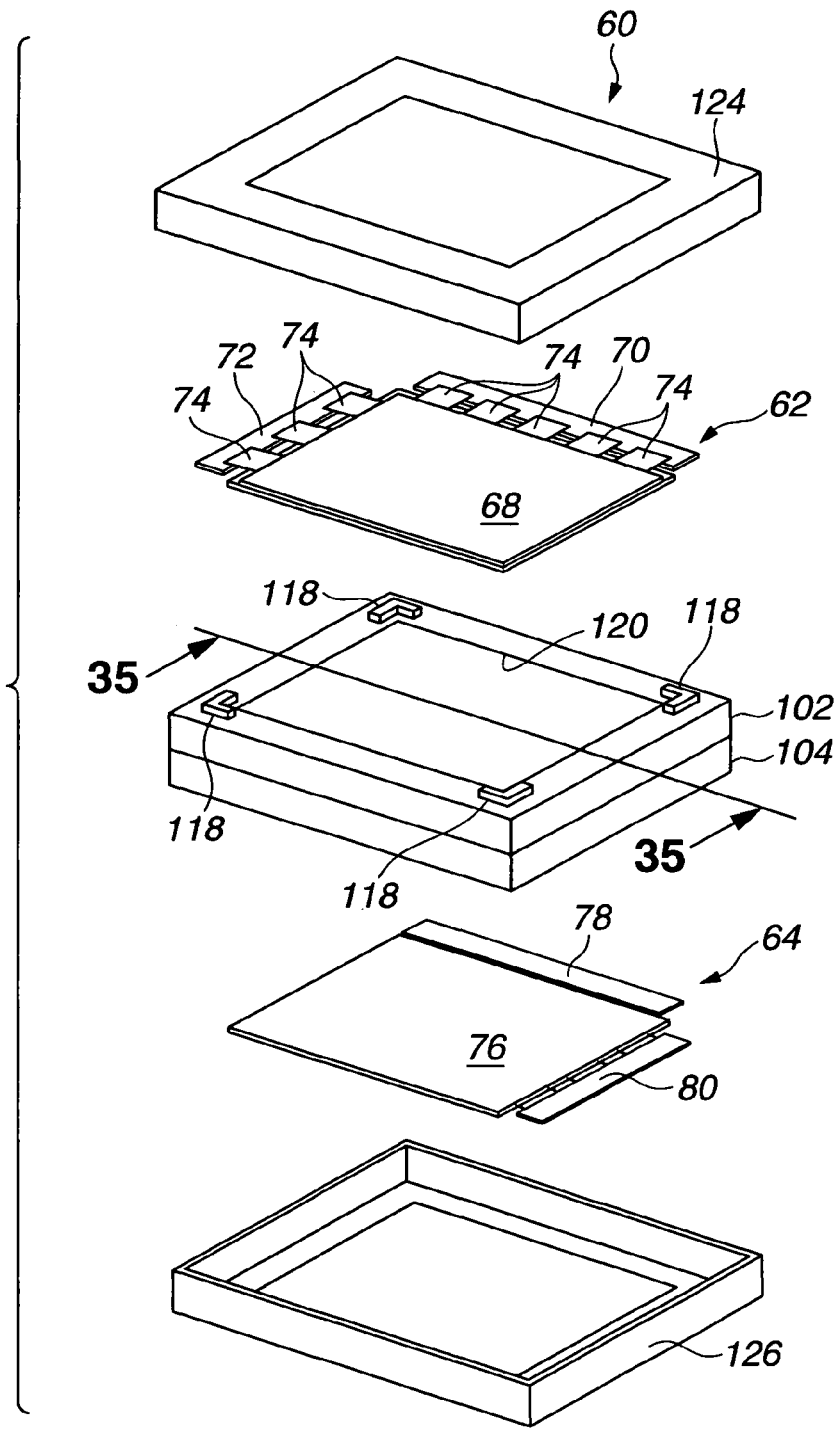
FIG. 33 is an exploded view of another conventional display device.
Figure 34:
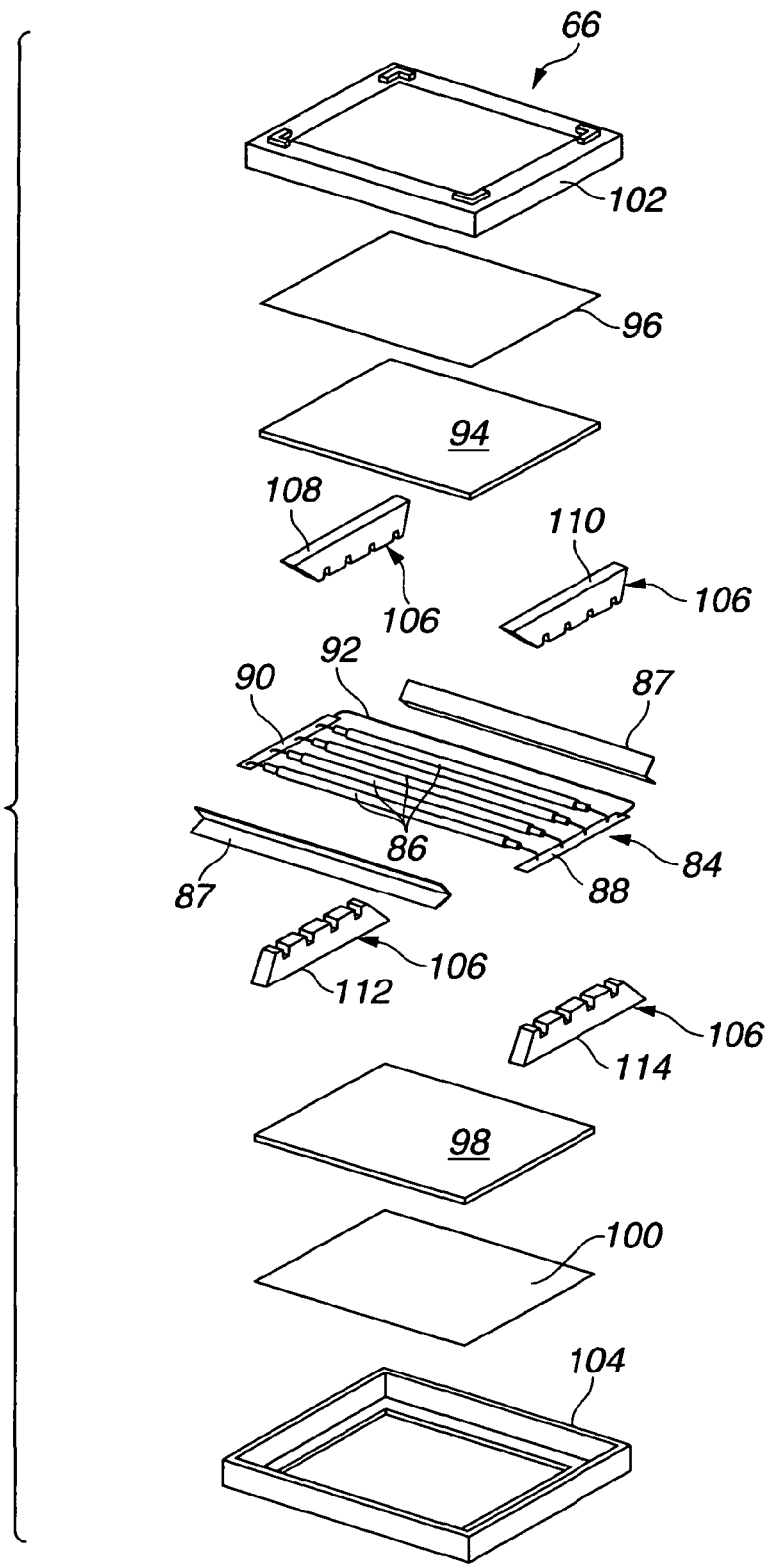
FIG. 34 is an exploded view of a backlight unit of the display device.
Figure 35:
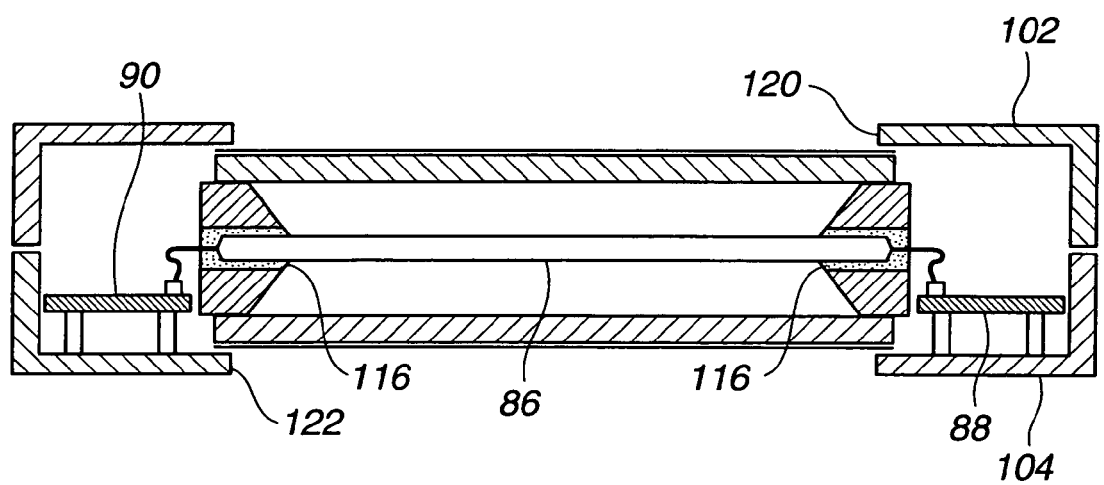
FIG. 35 is a cross section taken through the line 35-35 in FIG. 33.

FIGS. 28 and 29 illustrate other form of bracket 184C. This bracket 184C is substantially the same as the bracket 184B. In the bracket 184C, each mount rubber 210 is clamped within one of retainers 344 mounted to the first frame half 206; Each retainer 344 has ear-like clamps 346 so that the mount rubber forms smooth planes. As the mount rubbers 210 forms smooth planes, light inflecting sheets 340 may be adhered well to the mount rubber 210, making it easy to mount linear lamps 188. As shown in FIG. 28, the retainers 344 are preferably positioned slightly below the height of the first frame half 206 so that the mount rubbers 210 may not interfere with movement of a bracket 184 relative to a chassis, not shown, for lamp replacement.

The present application claims the priority of Japanese Patent Application No. 2003-140226, filed May 19, 2003, the disclosure of which is hereby incorporated by reference in its entirety.

What is claimed is:

1. A backlight unit comprising:
a chassis having a bay, wall means defining the bay, an aperture opening to the bay, and an optical panel that includes at least one light management feature, the optical panel having one side forming a wall portion of the wall means;
a light emitting structure placed within the bay to light a two-dimensional area on the one side of the optical panel, the light emitting structure having at least one linear light source and a power control circuit coupled to the linear light source; and
a bracket for quick installation and removal of the light emitting structure through the aperture to and from the bay, the bracket having a support structure carrying the light emitting structure, the support structure having a frame for supporting the linear light source and a circuit mount having two portions for supporting the power control circuit,
the bay within the chassis including a first region for receiving the frame of the support structure and two second regions for receiving the two portions of the circuit mount of the support structure, respectively;

the at least one linear light source including a parallel arrangement of a plurality of linear lamps;

the frame having a predetermined line and two sides spaced along the predetermined line, and each of the two portions of the circuit mount extending from one of the two sides in a remote direction from the other of the two sides;

wherein, at the two sides, the frame holds two ends of each of the plurality of linear lamps, respectively, and the circuit mount holds the power control circuit;

the bracket including at least one light leak prevention feature;

the chassis including a guide for the frame of the support structure to slide relative to the chassis;

the light leak prevention feature including a second light shield arranged to cover a clearance between the frame of the support structure and the guide of the chassis;

wherein the first region includes guide spaces defined by the guide, the guide spaces are open to the second regions, respectively, and the second regions are greater in width than the guide spaces;

wherein the frame of the support structure within the guide defines within each of the guide spaces the clearance; and wherein the support structure includes the second light shield between each of the two sides of the frame and the adjacent one of the two portions of the circuit mount.

* * * * *